INVENTOR.
VLADIMIR H. PAVLECKA,
BY Nicholas T Volk
ATTORNEY.

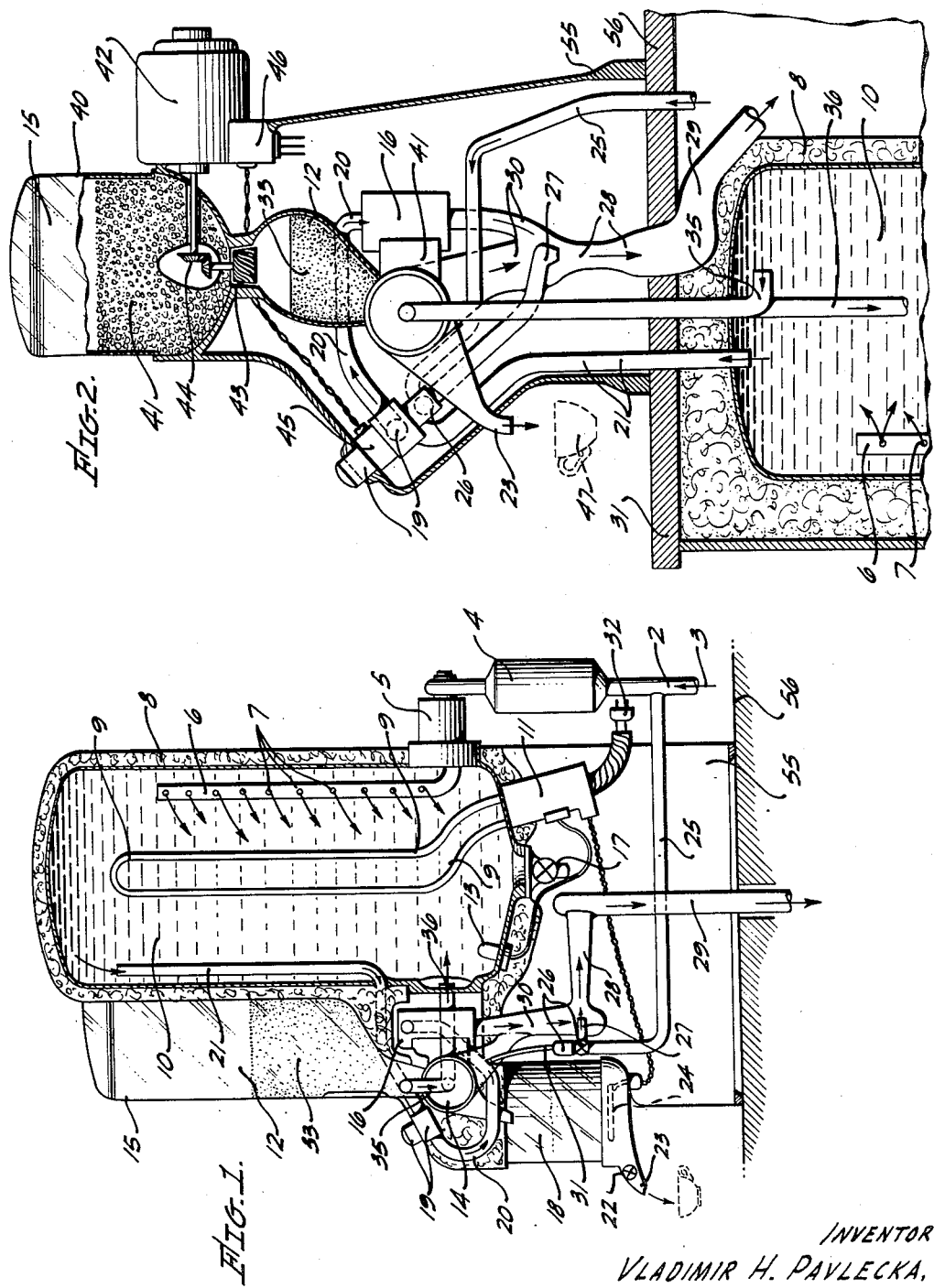

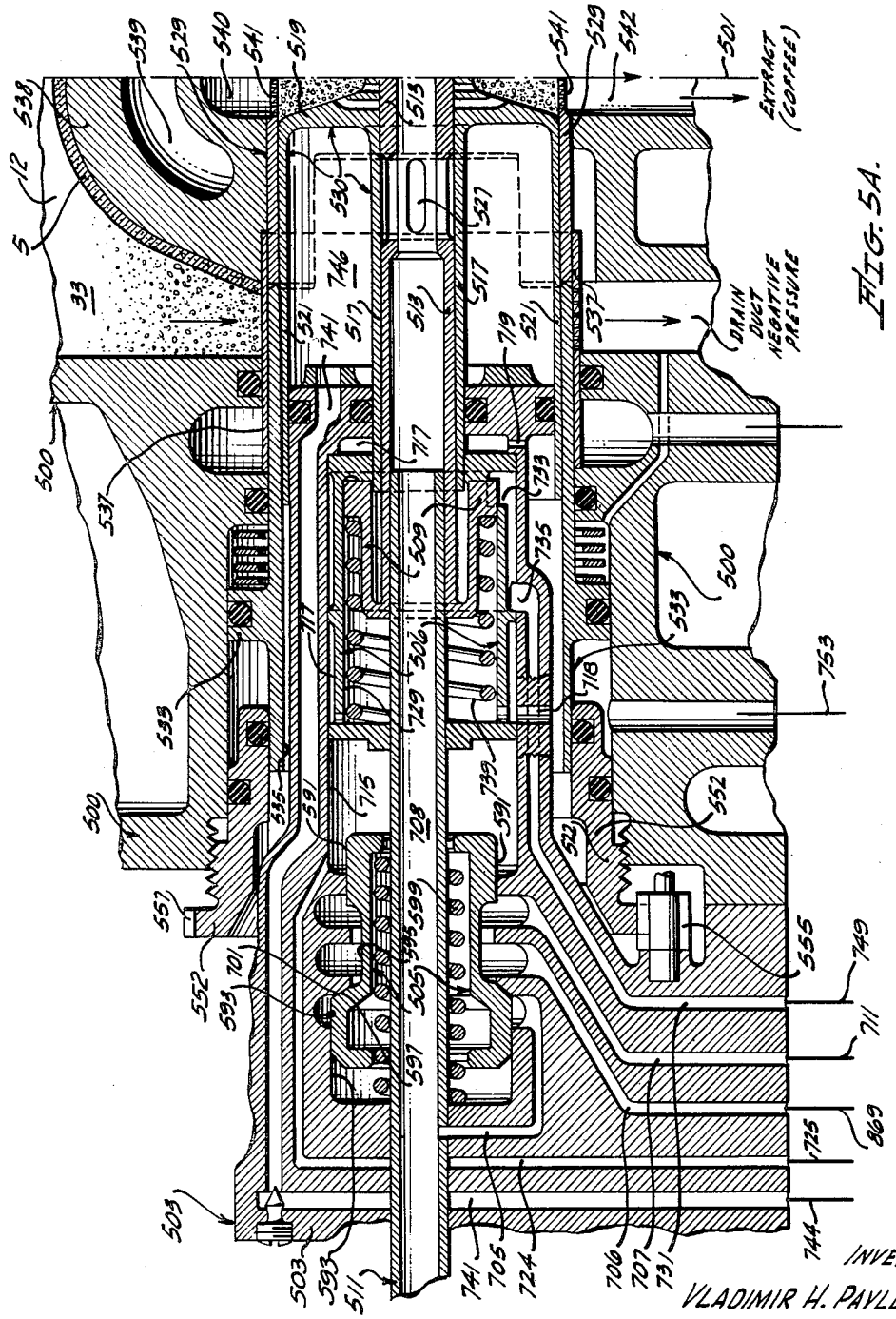

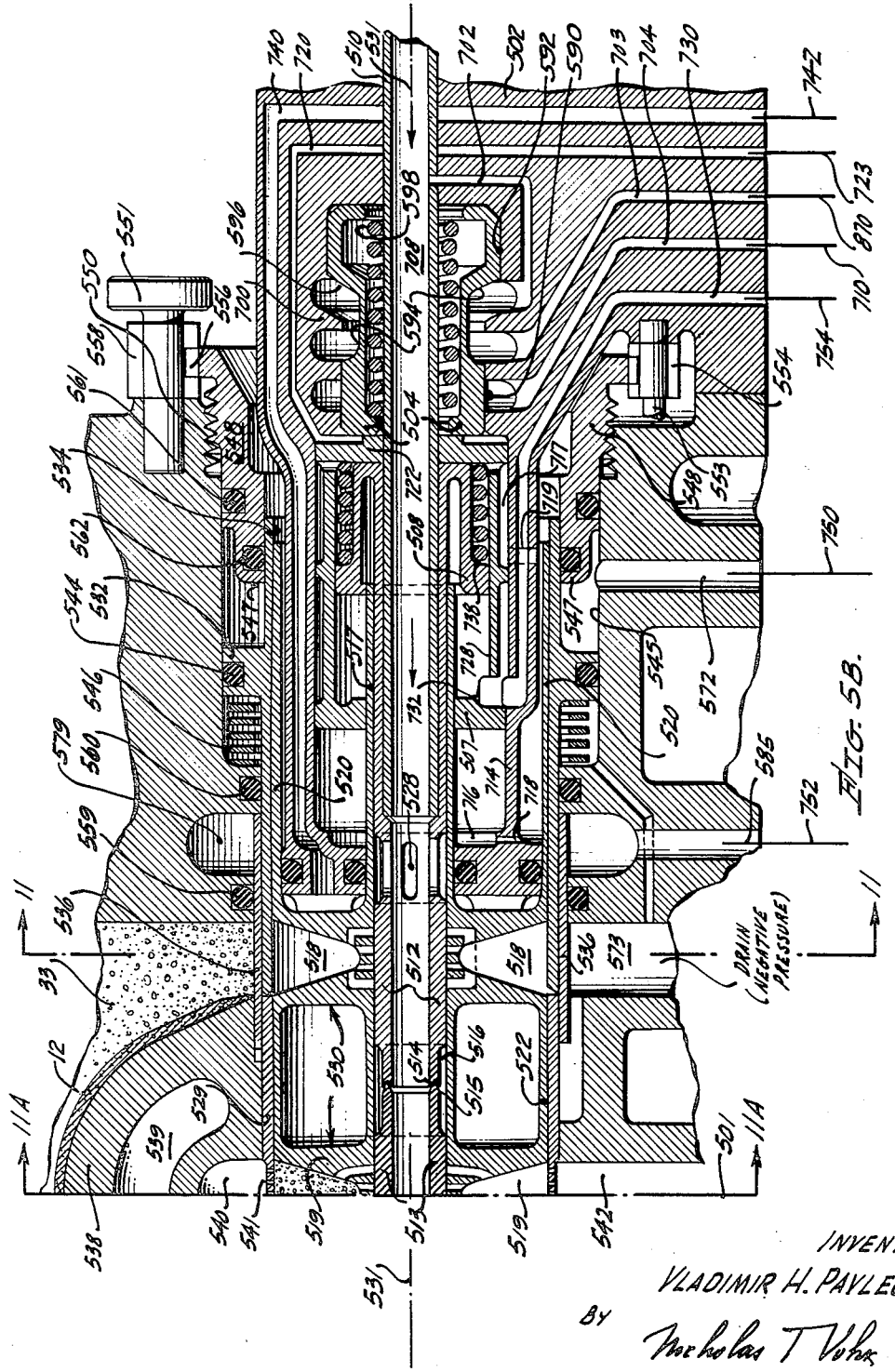

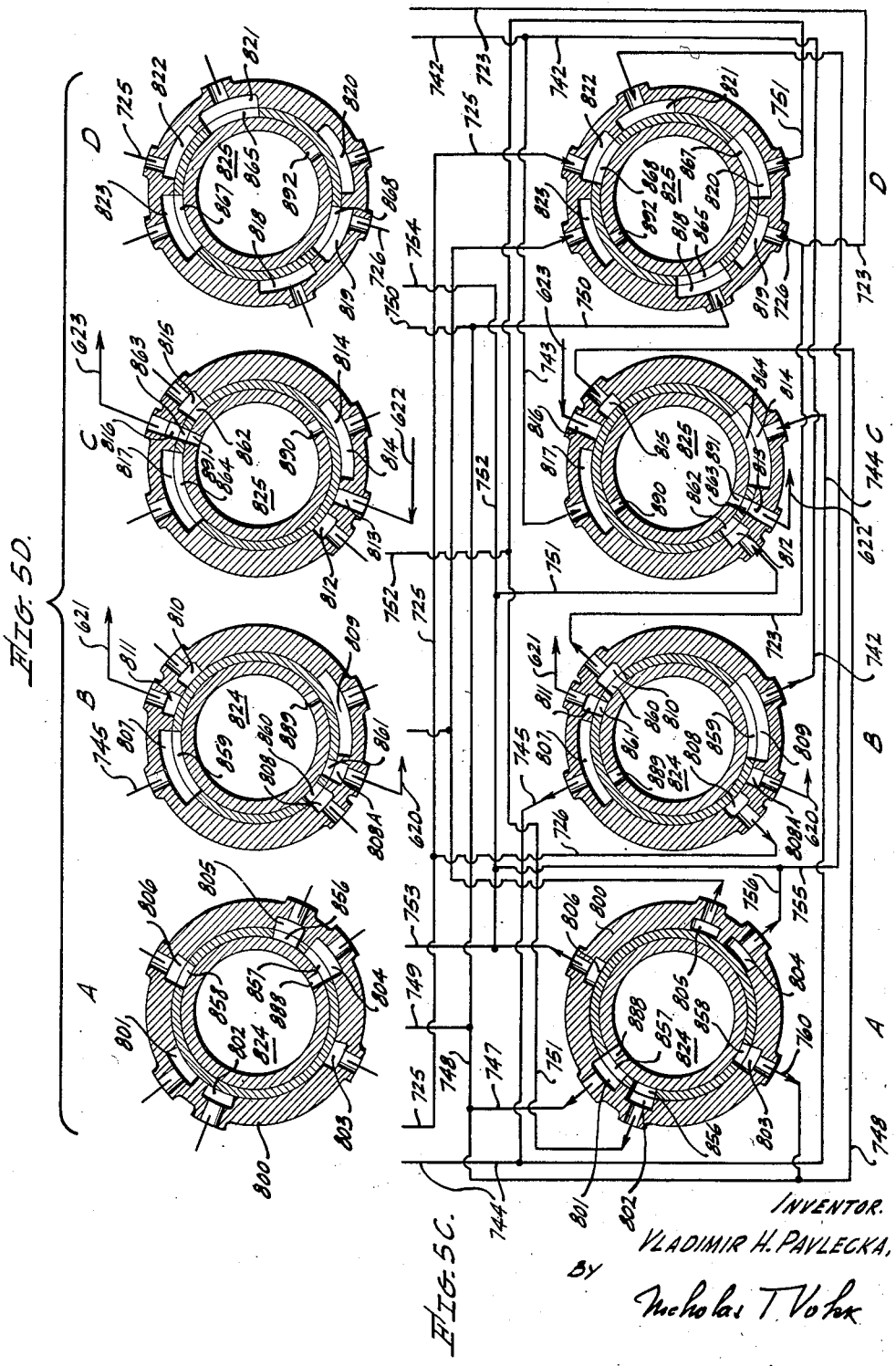

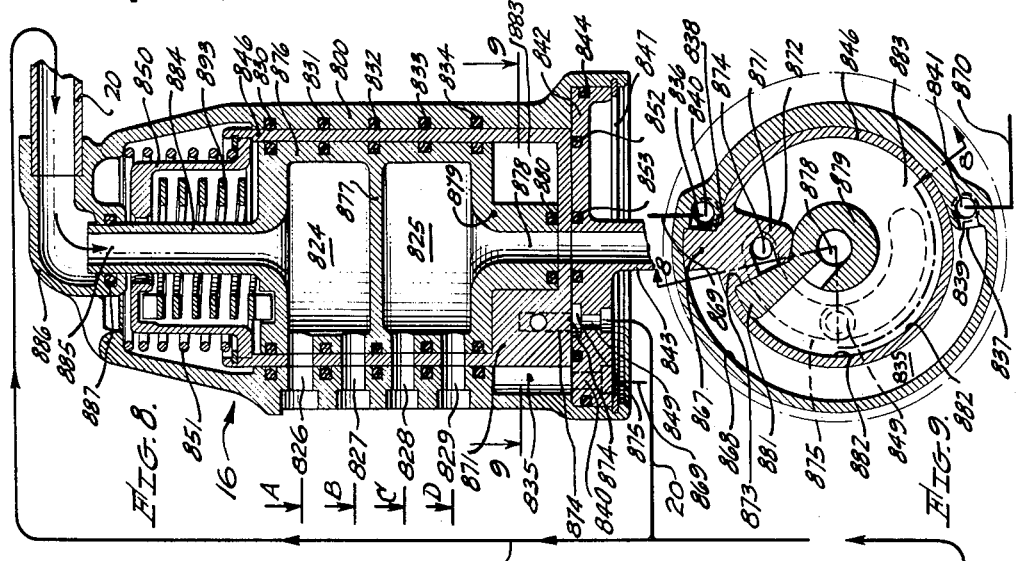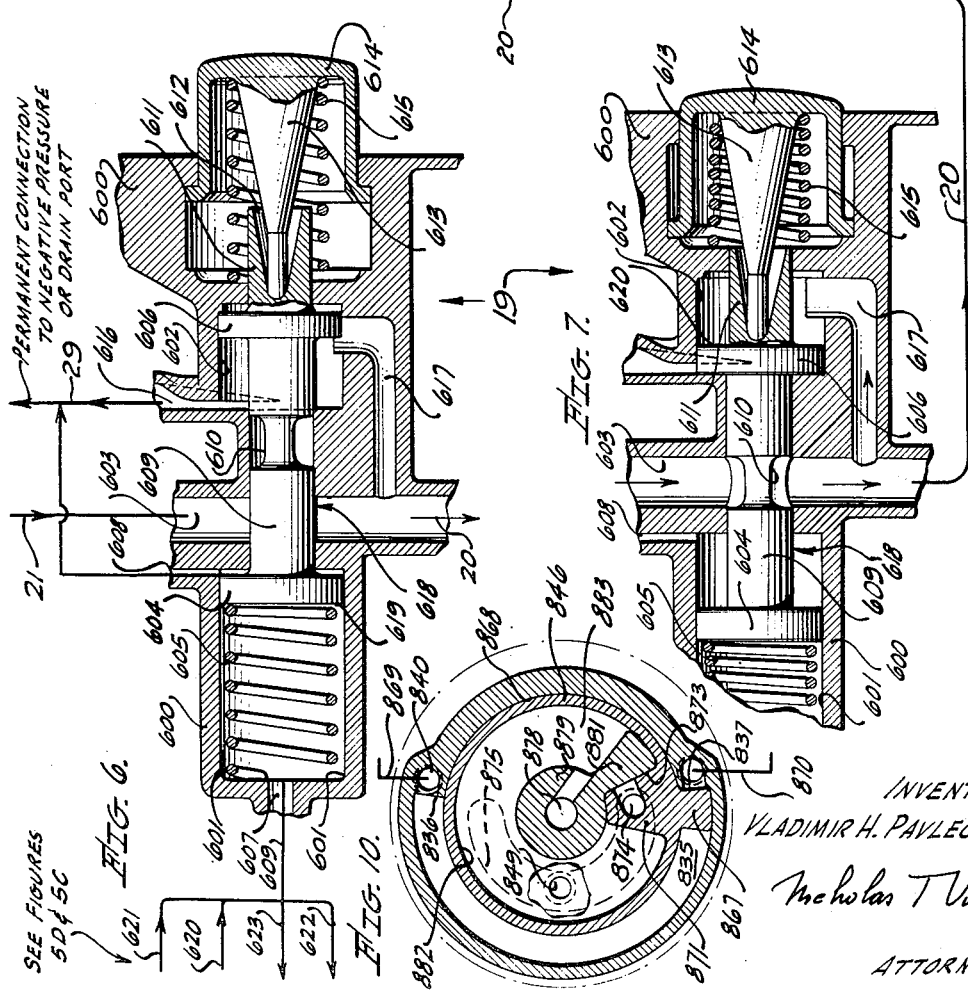

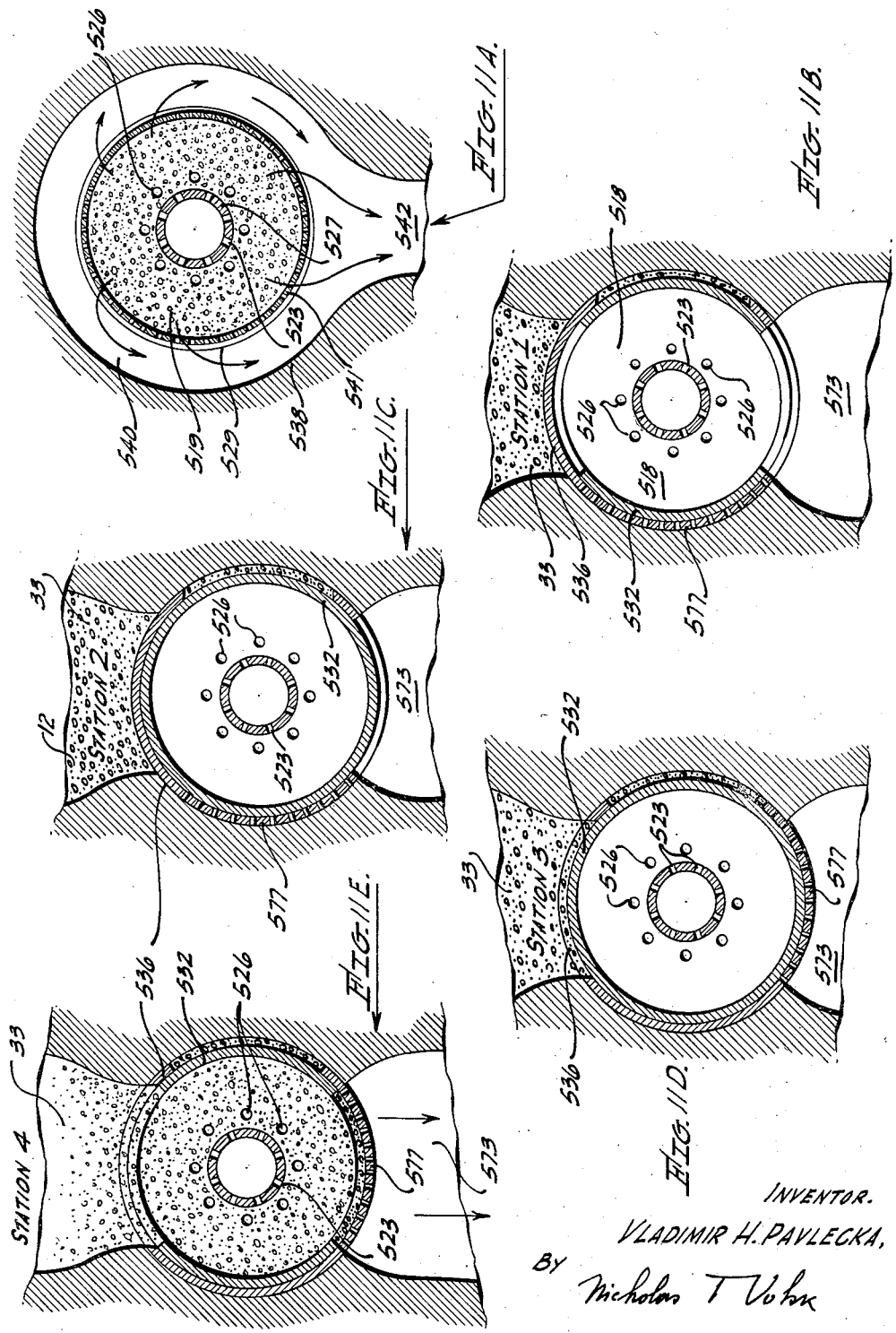

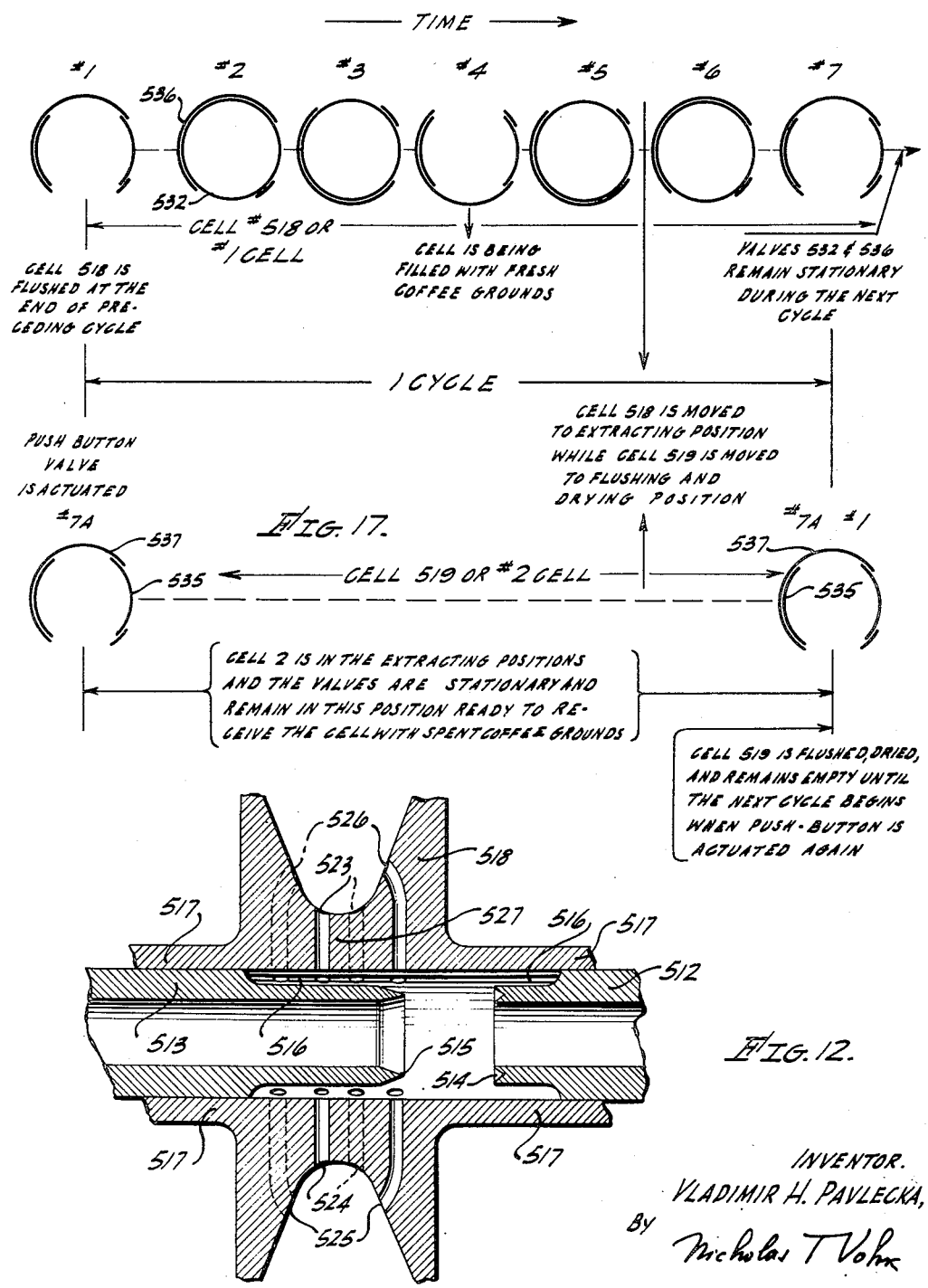

Oct. 29, 1957 — V. H. PAVLECKA — 2,811,098
AUTOMATIC EXTRACTING MECHANISM
Filed April 24, 1952
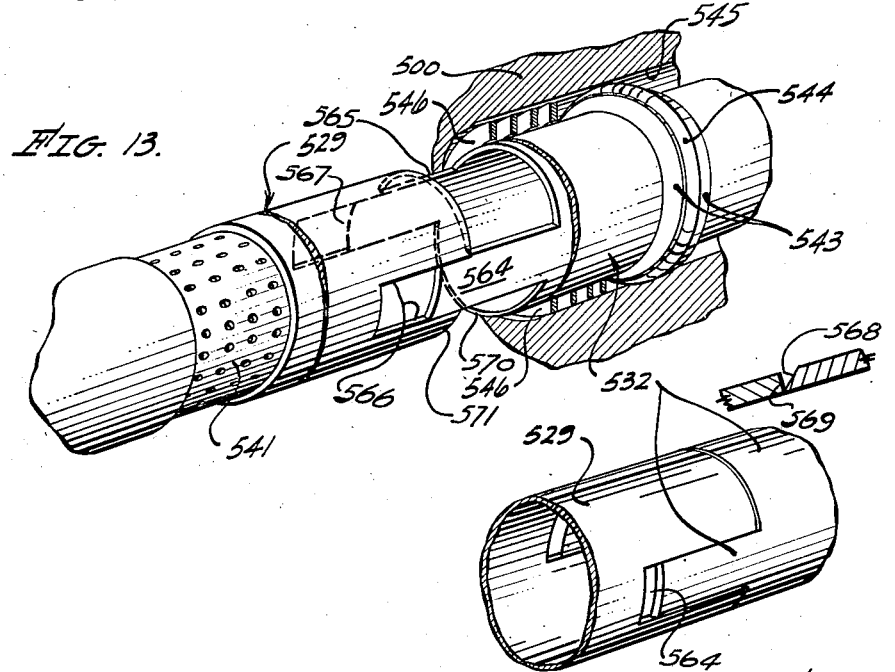
FIG. 13.
FIG. 14.
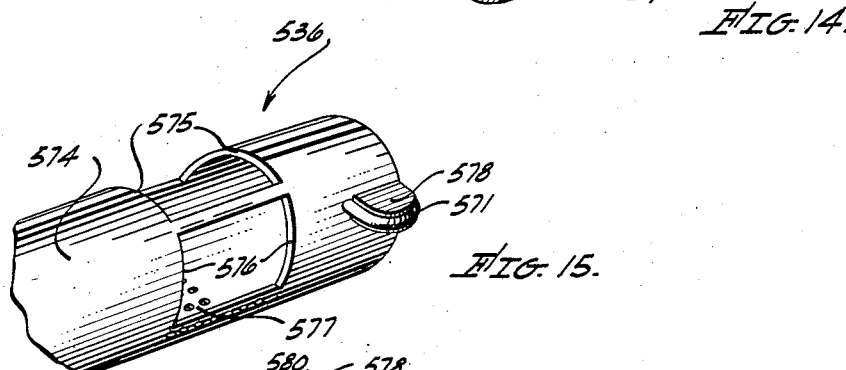
FIG. 15.
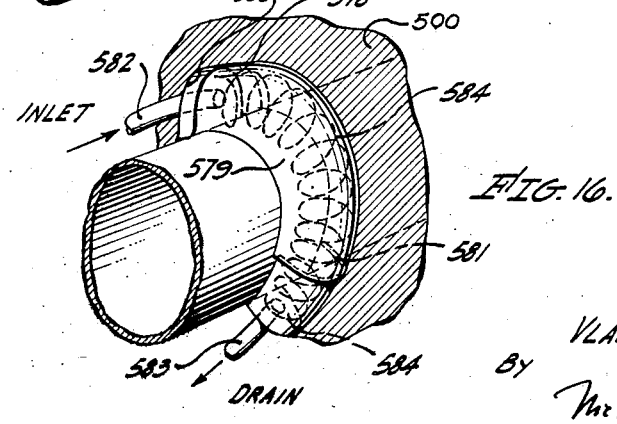
FIG. 16.
INVENTOR.
VLADIMIR H. PAVLECKA,
By Nicholas T Vohs
ATTORNEY.

United States Patent Office 2,811,098
Patented Oct. 29, 1957

2,811,098

AUTOMATIC EXTRACTING MECHANISM

Vladimir H. Pavlecka, Pacific Palisades, Calif.

Application April 24, 1952, Serial No. 284,141

37 Claims. (Cl. 99—283)

This invention relates to an automatic machine for extracting essences from various substances containing soluble essences.

The machine disclosed in this specification is suitable, for example, for extracting coffee or tea essences from ground coffee beans or tea leaves, where it finds its most direct and immediate application, and therefore it will be described in connection with one of the above applications, namely, automatic coffee making. It is to be understood, however, that the disclosed automatic extractor is applicable to any other tyyes of extracting processes where one substance, a solvent, is used for dissolving some desirable fraction of another substance containing a solute within the framework of the second substance.

Automatic coffee makers known to the prior art and now in use generally use the so-called "instant coffee" which represents a dehydrated extracted coffee fraction suitable for making a beverage for human consumption. The disadvantage of such machines is that they are not capable of producing a coffee beverage with taste comparable to that of fresh coffee beverage made of freshly ground roasted coffee beans. The above lack of proper taste in a coffee prepared according to the above method is well known to those skilled in the art of making coffee, but the machines of the prior art adapted to make coffee have been using and use now "instant" coffee since the operating cycle of such machines is quite simple and consists merely of mixing hot water with the proper amount of the "instant" coffee essences. The word "instant" in itself is quite indicative of the process that is involved, and signifies that one need not be concerned with the process of extracting the coffee essences from the ground coffee. It thus follows that in the prior art simplicity of the operating cycle and simplicity of the machines using this cycle are all obtained at the expense of obtaining an inferior final product.

The automatic extractor disclosed in this application makes it possible to obtain coffee beverage from the ground coffee rather than "instant" coffee with the concomitant improvement in the taste of the finally obtained beverage. It would be idle to compare the operating cycle of the disclosed automatic extractor with those of the prior art using instant coffee powder because the cycles have practically nothing in common and, therefore, nothing would be gained by attempting such comparison.

Prior art also discloses a number of machines, some automatic, some semi-automatic in which extraction of coffee grounds is performed. The prior art machines are of varying degrees of mechanical, electrical or electromechanical complexities, none of which have found their way into actual use because of various practical limitations. Some lacked proper sealing of various chambers in closing and opening processes of these chambers; some were too slow in operation; some could not be maintained in sanitary condition without frequent dismantling for cleaning and overhauling; some had faulty cycle which could not produce coffee extract of uniform quality and freshness; and some disclosed inoperative devices.

It is therefore an object of this invention to provide a hydraulically operated, completely automatic extractor using an intermittent operating cycle for extracting suitable essences from various substances containing essences which can be dissolved in some suitable liquid solute.

It is an additional object of this invention to provide an automatic hydraulically operated extractor for making coffee or tea beverage from the so-called coffee grounds (ground roasted coffee bean) or from dried tea leaves.

It is an additional object of this invention to provide a sealed automatic extractor operated by a fluid under pressure.

Still another object of this invention is to provide an automatic extractor having a solvent tank, a fluid-operated system for shuttling extraction chambers, a hopper for a material containing an extractable essence, and a fluid-operated system for automatically connecting and disconnecting the shuttling chambers to the tank and then to the hopper, and then again to the tank for accomplishing the extractions and for automatically disposing of the waste products and cleaning, drying, loading, extracting, and again cleaning, etc. said extraction chambers.

It is an additional object of this invention to provide an automatic coffee-making machine in which the operating cycle begins with a roasted coffee bean and ends with a coffee beverage of adjustable strength.

Yet another object of this invention is to provide a novel fluid-operated distributor valve capable of connecting a plurality of ducts to positive and negative pressure sources in a predetermined sequence.

Still another object of this invention is to provide a novel fluid-operated servo mechanism including a distributor valve and a shuttling mechanism operated by the shuttling valve.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Referring to the drawings,

Figures 1 and 2 are vertical cross-sectional views of two types of automatic extractors;

Figure 4:
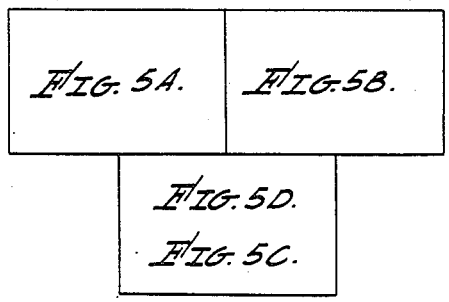
Figure 4 illustrates the relative positions of Figures 5A, 5B, 5C, and 5D with respect to each other for proper reading of these three figures as a single figure.

Figures 5A, 5B, 5C and 5D, which should be matched along the indicated lines in the manner illustrated in Figure 4, illustrate a vertical cross-sectional view of an automatic extracting mechanism (Figs. 5A and 5B) and horizontal sections of a distributor valve (Figs. 5C and 5D) with the pipe connections between the valve and the cell assembly being illustrated diagrammatically by means of straight lines;

Figures 6 and 7 are cross-sectional views of a pushbutton valve in closed and open positions respectively;

Figure 8 is a vertical cross-sectional view of the distributor whose four horizontal cross-sectional views are illustrated in Figs. 5C and 5D and the bottom horizontal cross-sectional views are illustrated in Figs. 9 and 10;

Figures 9 and 10 are horizontal cross-sectional views of the distributor valve taken along line 9—9 illustrated in Figure 8;

Figures 11A through 11E are vertical cross-sectional views of an extracting cell and of its valves illustrated in five different operating positions of the cell;

Figure 12 is an enlarged cross-sectional view of the central portion of one of the extracting cells;

Figures 13 and 14 are perspective views of a slide valve 532 used in the extracting mechanism illustrated in Figures 5A and 5B;

Figures 15 and 16 are perspective views of a rotatable valve 536 used in the extracting mechanism of Figs. 5A and 5B;

Figures 17 is an explanatory figure illustrating various positions of valves during the operating cycle of an extracting mechanism.

Referring to Figure 1, it illustrates the vertical cross-sectional view of the automatic extractor in which the solvent tank 10 and the hopper 12 for the essence-bearing substance are mounted above the automatic extractor cell 14, with the distributor valve 16 being mounted on one side of the extractor cell 14. The extractor is also provided with an extract chamber 18 mounted under the extractor cell 14.

Proceeding with a more detailed description of Fig. 1 and assuming for the purpose of illustration that the extractor is used for extracting coffee grounds, the extractor water tank 10 is connected to a source of water supply through a pipe 2, the direction of water flow being illustrated by an arrow 3. Water in pipe 2 should be under some suitable pressure, such as that used in ordinary domestic water-supply systems. As a rule, the water mains pressure is of the order of 60 to 70 pounds per square inch. Pipe 2 is connected to a water filter 4, and then to a pressure-regulating and reducing valve 5, which is connected to the water tank 10 through an inlet pipe 6 provided with a plurality of orifices 7 which are used for uniform distribution of the in-coming cold water throughout the hot water contained in tank 10. The pressure reducing valve reduces the mains pressure to approximately 30–35 pounds per square inch. The water tank 10 is covered with an insulating layer 8 and water within the tank is heated to a temperature of the order 210° F. at 30 or 35 pounds of pressure, i. e., below the boiling point of water at normal atmospheric pressure. This water heating can be accomplished by either an electric heating element 9 or a gas heater (not illustrated). When electric heater is used, it is connected to a source of power 32 through a thermostat 11 which is controlled by a thermocouple element 13. The water tank is provided with a conventional drain valve 17. The coffee grounds are conveyed by gravity to the extractor cell 14, which will be described more in detail later in connection with the description of Figs. 5A through 10E. The cell is actuated by means of the bush-button 19, which, after it is depressed, connects the cell and its actuating mechanism to the water tank 10 through a pipe 20 and the distributor valve 16. The push-button valve 19 is connected to tank 10 through an inlet pipe 21. The extractor mechanism is supplied with circulating hot water through pipe 21, pipe 35 and pipe 36, the latter discharging cooled water into tank 10. Hot water from tank 10 is, therefore, used as a motive power for the actuating mechanism, and some portion of the hot water coming from tank 10 is also used for extracting coffee essence from the coffee grounds supplied periodically to one of the extracting cells contained within the extractor 14, two extractnig cells being provided within the extractor. The actuating mechanism shuttles the two cells into two consecutive positions, one position being extracting or coffee-making position, when coffee is the material used, while the second position is the one in which the cell in the second position is washed out of used up coffee grounds, dried and refilled again with fresh coffee grounds from hopper 12, whereupon the first cell, after completion of the extraction step, is advanced to the "refill" position, and the second cell, filled with the fresh coffee grounds, is shuttled, by means of the actuating mechanism (Figs. 5 through 10) into the "extraction" position. Upon the completion of the extraction step for cell #2 and washing and drying steps for the same cell #2, the push-button valve 19 is automatically shut off, thus completing the entire extracting cycle. The complete cycle consists, therefore, of the following steps for the two cells:

| Cell #1 | Cell #2 |
|---|---|
| 1. In the central position filled with fresh coffee grounds. | 1. In the "side" position, dry, empty and ready to receive fresh coffee grounds. |
| 2. Push button valve 19 is actuated | |
| 3. Hot water is supplied to cell #1 for extracting and making coffee and metered amount of hot water is allowed to pass through the coffee grounds and out into the extract chamber 18 as coffee beverage. | 3. Filled with fresh coffee grounds from hopper #12 and thereafter disconnected from hopper 12, thus being made ready to be moved from the "refill" position to the "extraction" or central position. |
| 4. Hot water is disconnected from the cell and it is shuttled over to the "refill" position; connected to hot water source; spent coffee grounds are flushed out; cell is dried and left empty, ready to receive coffee grounds from hopper 12 when the second cycle begins. | 4. Shuttled over to the extraction position ready for the next extraction cycle. Remains disconnected from hot water source and thus awaits the next cycle in dry state. |
| 5. Push button valve 19 is automatically closed. | |

The extract chamber 18 is provided with a valve 22 and a spout 23, which are used for filling individual cups with coffee beverage from chamber 18. Chamber 18 is kept warm by means of an electric heater 24.

Cold water pipe 2 is also connected through a pipe 25, valve 26 and jet nozzle 27 to an ejector pump 28 for creating vacuum in a duct 30. This duct is connected to the extractor cells and extractor mechanism 14 where this vacuum is used for drying the cells and for facilitating the filling up of the cells with fresh coffee grounds. The ejector pump 27 normally is shut off by means of valve 26 which is actuated by hot water through a pipe 31 at the time push-button valve 19 admits hot water into pipe 20.

The extractor illustrated in Fig. 1 is mounted on a base 55 which is supported by a counter 56.

Figure 2 illustrates another version of the extractor in which coffee beans are used as the starting point in the extraction cycle. Similar elements are similarly numbered in Figs. 1 and 2, and, therefore, perform the same function. The same cycle is used in both figures, and therefore, it needs no additional description. The difference resides in the introduction of the coffee beans hopper 40 which holds roasted coffee beans 41, a motor 42, coffee grinding mechanism 43 driven by motor 42 through gears 44, a micro-switch 45 actuated by push button 19 and a relay 46 which starts motor 42. The motor is started every time the coffee-making cycle begins, and its grinding rate is adjusted to keep sufficient supply of ground coffee 33 within hopper 12. Spout 23 does not have valve 22 since the coffee beverage is discharged directly into a cup 47 from the extraction cells within the extraction mechanism 14.

Figure 3:
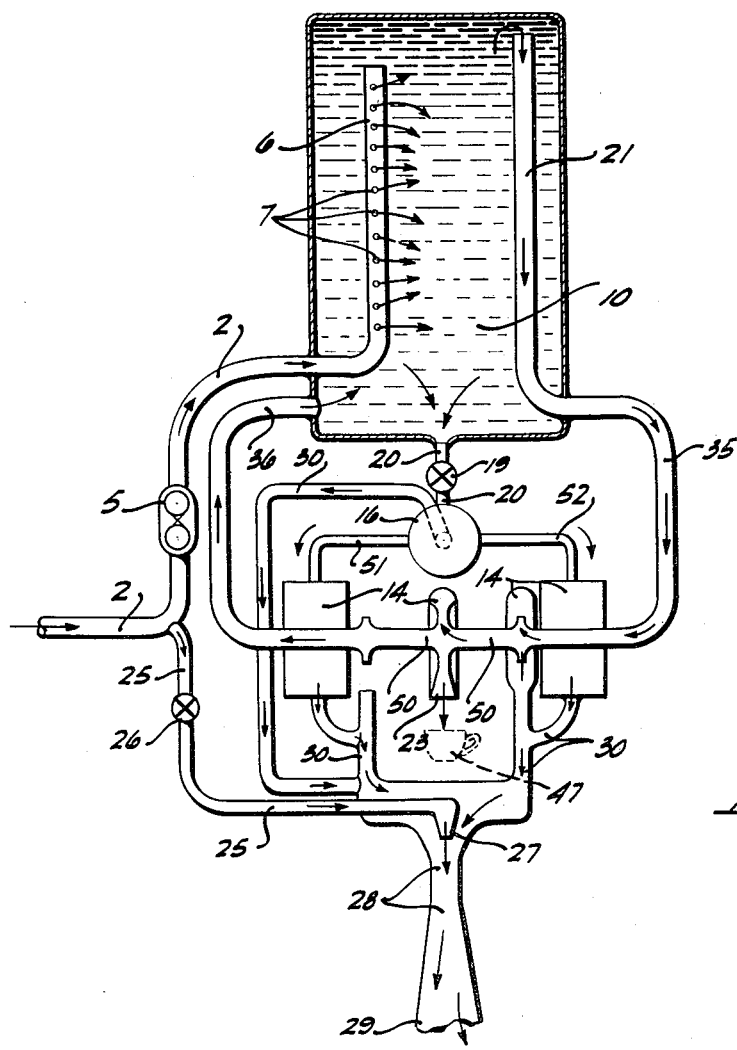
Figure 3 is flow diagram of the automatic extractors.

Figure 3 is a flow diagram of the automatic extractors illustrated in Figs. 1 and 2, all figures having the same numerals for identifying the corresponding elements. Cold water comes into tank 10 through pipe 2, pressure regulating and reducing valve 5 and stand pipe 6. It then enters hot water inlet pipe 21 which merges into pipe 35, the latter merging into a central duct 50 passing through the center of the extracting mechanism 14. Duct 50 performs three distinct functions within the extracting mechanism 14: it keeps the mechanism at constant temperature which is higher than the ambient temperature. It also supplies water for making coffee beverage within the extracting cells, and, finally it also supplies hot water for flushing out the spent coffee grounds from the cells. Duct 50 merges into pipe 36 which returns the slightly cooled water back into the heater, cooling of this water being caused by slight radiation losses from the extracting mechanism 14.

Hot water from tank 10 is also supplied to pipe 20 which is provided with the push-button valve 19, the latter being used for starting the operation of the extracting mechanism 14. As mentioned previously, this valve is normally in a closed position so that the extracting mechanism is at rest as long as valve 19 is in a closed position. When the push button opens valve 19, hot water is admitted into the extracting mechanism 14 through the distributor valve 16 where this hot water acts as a prime mover for actuating a plurality of valves, pistons, etc. which make the previously described cycle for cells #1 and #2 possible. Only two ducts, ducts 51 and 52 are illustrated between valve 16 and mechanism 14. Actually, as will be described more fully in connection with Figs. 5 through 10, there is a large number of separate ducts between these two members. Part of cold water is used for operating the ejector pump 28 which is actuated by opening valve 26 simultaneously with the operation of valve 19. This pump keeps the drainage ducts 30 under reduced pressure, these ducts discharging the spent coffee grounds into the drain 29; the reduced pressure also facilitating drying of the extraction cells after they are flushed out with hot water.

The techniques of making coffee beverage from ground coffee beans has been studied in the U. S. A. and also abroad for many years and there now is a unanimity in a general conclusion that the best beverage is obtained if the coffee grounds are extracted up to approximately 80% of soluble matter contained in the grounds at a temperature below 210° F., the length of actual contact between water and grounds determining the percentage of the extracted matter. 80% of soluble matter is extracted if the water temperature is of the order of 195°–205° F., and the extraction time is of the order of 8 seconds when the volume of coffee grounds is of the order of 12 cc., suitable for making one cup of coffee. From the above it follows that the process of making the best possible beverage must comply with the above parameters. The temperature requirement can be complied with quite readily by means of the thermostatic control of the water temperature within tank 10 in the manner indicated in Figs. 1 and 2. Proper amount of coffee grounds for individual extraction cycle is complied with by utilizing two extraction cells of equal volume, and filling them uniformly with known amount of coffee grounds of known quality. The only remaining step in the process is the use of proper amount or metered amount of water during the proper length of time for accomplishing the actual dissolution of 80% of the extractable matter from the metered amount of coffee grounds. Metering the proper amount of coffee grounds, water and length of time of extraction is all performed by the automatic extractor mechanism illustrated in Figs. 5 through 17 which is described below.

The entire mechanism includes three elements, all of which are operated by hydraulic pressure furnished through the water pipe 2 connected to the water mains. The three elements are the push-button valve 19 (Figs. 6 and 7), the distributor valve 16 (Figs. 5C, 5D, 8, 9 and 10), and the extraction mechanism 14 (Figs. 5A, 5B, and 11 through 17) which will be described in the order given above.

*Push-button valve*

(Figs. 6 and 7)

*Structure.*—The push-button valve is of special type which must remain open as long as the extracting cycle continues and which must close immediately upon the completion of the extracting cycle. The valve includes a valve housing 600 incorporating two cylinders 601 and 602 rigidly interconnected through a hot water duct 603 connected to hot water pipes 21 and 20 illustrated in Figs. 1 and 2. Cylinder 601 houses a return piston 604 and a return piston spring 605, while cylinder 602 houses a holding piston 606. The return piston cylinder 601 is provided with an inlet port 607 and a drain port 608. The inlet port 607 is connected through a pipe 609 to the pressure and drainage chambers 824 and 825 of the distributor valve 16, Fig. 8, by means of ports 808A, 811, 889, 861 and pipes 620 and 621 on level B (see Figs. 5C and 5D), and ducts 813, 863, 891, 816 and pipes 622, 623 on level C, which connect cylinder 601 normally to the drain port and at the end of the extraction cycle to the pressure port for a short period of time whereupon it is connected back to the drain port within the distributor valve. This will be described more fully later in the specification in connection with the description of the entire operating cycle of the extractor. Pipes 620, 621, 622 and 623 are all connected to pipe 609 and, therefore, form a parallel connection which is connected to one chamber at any given time, chamber 824 or 825, depending on the position of the distributor valve 16. Drain port 608 and a drain port 616 for cylinder 602 are connected to a drain pipe 29, Figs. 1 and 2, continuously through a fixed connection illustrated only in Fig. 6. Cylinder 602 is also provided with a duct 617 which connects cylinder 602 to the hot water duct 603. The two pistons 604 and 606 are rigidly interconnected through a piston rod 609 which forms a sliding fit with housing 600. Piston rod 609 is provided with an undercut 610 which, when in the position illustrated in Fig. 6, shuts hot water off, and opens the valve in the position illustrated in Fig. 7. To the right of piston 606 there is an integral sleeve 611 which slides back and forth in a bore provided in the wall of cylinder 602. Sleeve 611 is provided with a cone-shaped recess 612 terminating in a semi-spherical seat which normally is engaged by the matching semi-spherical surface of a plunger or push-rod 613 affixed to a push button thimble 614 which forms a sliding fit with housing 600. A thimble spring 615 keeps thimble 614 normally in its outer position illustrated in Fig. 6.

The operation of the push button valve 19 is as follows: normally the valve is in closed position illustrated in Fig. 6, spring 605 keeping it in this position. When thimble 614 is pushed in, the two pistons, the piston rod and sleeve 611, constituting a single element, which will be called here a valve spool 618, slides over to the left position, illustrated in Fig. 7. Duct 617 at once becomes connected to duct 603 since the valve now is in an open position and hot water enters cylinder 602 and presses against piston 606 thus holding the valve open overcoming the pressure of spring 605. At this time cylinder 601 is connected to drain pipe 29, through pipes 609, 622, ducts 813, 863, 891, chamber 825 and pipe 843 (see Fig. 8), and, therefore, the static pressure exerted by water on piston 606 is sufficient to hold the valve open. When the distributor valve, at the completion of the extraction cycle, connects cylinder 601 to the same water pressure that is exerted on piston 606, since the area 619 of piston 604 is the same or greater than the area 620 of piston 606, the entire valve spool 618 is returned to the closed position illustrated in Fig. 6. This return takes place because the hydraulic pressure on piston 604 is greater and, in addition, this pressure combines with the pressure exerted by spring 605. Positive pressure connection is obtained through pipes 609, 621, ducts 811, 861, 889, chamber 824 and pipe 20.

It is to be noted here that once valve 19 is opened, valve spool 618 will remain in the open position until it is closed by distributor valve 16, and actuation or pressing on push button 614 will have no effect on the valve or the cycle of its operation because valve 19, upon its initial actuation, is under complete control of the distributor valve 16. Thus the extraction cycle is not disrupted by an indiscriminate repeated actuation of the push button by a careless user once the cycle has been started.

Distributor valve

(Figs. 8, 9, 10 and 5C–D)

*Structure.*—The distributor valve 16, Figs. 1 and 2, is illustrated on an enlarged scale in Figs. 8, 9 and 5C–D. It is used to control sequential operation of the entire extracting mechanism illustrated in Figs. 5A and 5B and for shutting off the push-button valve by connecting cylinder 601 to the hot water pressure lines 620 or 621 which, by exerting hydraulic pressure on surface 619 of piston 604 shuttles valve spool 618 from the open position illustrated in Fig. 7 back to the closed position indicated in Fig. 6. Thus, the operating cycle is started with manual actuation of the push-button valve 19 and from then on the entire operation and timing of the operating cycle of the automatic extractor is under complete control of the distributor valve, as will be described, in part, in this section of the specification, and concluded in the last part entitled "Extracting mechanism."

Referring to Fig. 8, the valve comprises an outer cylinder block 800 open at both ends and having a plurality of pressure ports 801 through 811, Fig. 5C, and a plurality of drain ports 812 through 823, Figs. 5C and 5D, located around the periphery of the cylinder block 800. These ports are illustrated only schematically in Fig. 8 to indicate that a pressure chamber 824 has two series of circumferential ports 826 and 827, the first series being positioned on a level "A," while the second series is positioned on a level "B," indicated in Fig. 8. Similarly, there are two series of circumferentially located drain ports 828 and 829 communicating with a drain chamber 825. The actual circumferential positions of these four series of ports is illustrated in Figs. 5C and 5D, positions A, B, C, D, which represent horizontal cross-sections of the distributor valve at the levels A through D indicated in Fig. 8. A study of the angular locations of all the ports in Figs. 5C and 5D reveals the fact that there is no angular position of the ports in which all of them, A through D levels, would be in a vertical alignment, as indicated in Fig. 8. Therefore, the presentation of the ports 826 through 829 in Fig. 8 is merely for indicating the existence of four port levels, rather than for indicating their proper angular positions. As stated above, true angular positions of the ports are indicated in Figs. 5C and 5D. The cylinder block is also provided with five recesses for accommodating five O rings 830 through 834 which are used for preventing any leakage of fluid from one level to another. The lower portion of the cylinder block 800 is provided with an inner sleeve swing piston cylinder 835 whose cross-sectional view is illustrated in Fig. 8 in the lower left corner, while its plan view is illustrated in Fig. 9 as a semi-circular cylindrical locus. Cylinder 835 begins on one side at a stop face 836 and ends at the other side at a stop face 837, these faces being provided with horizontal orifices 838 and 839 connecting the vertical ducts 840 and 841 to the cylinder. The bottom portion of cylinder block 800 is closed with a disk 842 having a centrally located opening connected to a drain pipe 843. Disk 842 is provided with a plurality of recesses for O rings 844, 852 and 853 which make a water-tight joint with the cylinder block 800 and with the bottom portion of an outer sleeve valve 846 forming a sliding fit with the inner cylindrical wall of block 800. Disk 842 is held in fixed position with respect to block 800 by a snap-ring 847 which is snapped into a circular groove in block 800. Disk 842 is provided with three ports 840, 841 and 849. The ports 840 and 841 are connected to pipes 869 and 870, respectively, while port 849 is connected to pipe 20.

The upper portion of the outer sleeve valve 846 represents a straight hollow cylinder with an open top. Its bottom is closed off, except for a vertical port 874. The top portion of valve 846 is closed with an inverted cup 850 which forms a non-sliding fit with the valve. A spring 851 is used to press the bottom of valve 846 against the inner surface of disk 842 and the O rings 852 and 853 which mutually seal off the ports 840, 841, a horizontal galley 875, and drain pipe 843. The upper part of spring 851 forms a sliding fit with the spring seat provided for it in block 800 and it also forms a sliding fit with an identical spring seat on the flange portion of cup 850. Those portions of the sleeve valve 846 which are on the same level with pressure chamber 824 and drain chamber 825 are provided with a plurality of ports or openings, ports 856 through 861, Figs. 5C and 5D, being pressure ports and ports 862 through 868 being the drain ports. The actual angular positions of all of these ports is illustrated in Figs. 5C and 5D. In Fig. 5C the positions of these ports corresponds to the position of the sleeve valve 846 illustrated in Fig. 9 (piston 867 is against stop-face 836), while in Fig. 5D piston 867 is against stop-face 837. The latter is illustrated in Fig. 10.

The bottom portion of valve cylinder 846, as illustrated in Fig. 9, is provided with a swing piston 867 which makes a sliding, leak-proof contact with all surfaces 868 of its cylinder. The swing piston makes an approximately 180° turn between the two stop faces 836 and 837. To make this possible, the inlet-outlet port 840 is connected to a duct or pipe 869 and the inlet-outlet port 841 is connected to a duct or pipe 870, both of which are connected in alternate successions to hot water pressure duct 50, Fig. 3, which corresponds to the central duct 708 in Figs. 5A and 5B, or to the drain duct 29. Thus, when port 840 is connected to the source of positive pressure (duct 50, Fig. 3) port 841 is connected to the source of negative pressure created by the syphon pump 28, Figs. 1, 2 and 3, the created differential pressure producing the rotation of piston 867 and sleeve valve 846. Such rotation of the outer sleeve valve first in a counter-clockwise direction and then in a clockwise direction connects the previously mentioned pressure and drain ports 856 through 868 to the ports distributed around the periphery of the cylinder block 800 so as to reverse the timing in the distributor valve, as will be described more fully in "Functional cycle of extractor." Stated differently, when valve is in the position illustrated in Fig. 9, it is arranged for extracting coffee from cell #1 and loading cell #2. When it is in the position illustrated in Fig. 10, the cell functions are reversed: extracting with cell #2 and loading cell #1. The outer sleeve valve 846 is also provided with a boss or a tooth 871 having two stop faces 872 and 873 and a port 874. Disk 842 is provided with the semi-circular undercut or horizontal galley 875 which maintains a constant open connection between port 874 and port 849 within disk 842 irrespective of the angular position of port 874 which swings through approximately 180°. Port 849 is connected to the push button valve 19, Figs. 1, 2, 3, 6 and 7 through pipe 20 and, therefore, port 874 receives hot water under pressure immediately after the actuation of push-button valve 19.

An inner sleeve valve 876 is mounted within the outer sleeve valve 846. It comprises a hollow cylindrical body containing two centrally located chambers, pressure chamber 824 and drain chamber 825 separated from each other by a partition 877. The drain chamber is provided with a drain duct 878 which is centrally located within a cylindrical boss 879 which forms with its outer surfaces a sliding, leak-proof connection with tooth 871. The bottom portion of boss 879 forms a sliding fit with the bottom plate of valve 846 where an O ring 880 is used for obtaining a leak-proof, sliding connection between boss 879 and the bottom plate of valve 846. Boss 879 is provided with an inner swing piston 881 which forms a sliding, leak-proof fit with the inner cylindrical wall 882 and the bottom plate of the outer sleeve valve 846. When positive pressure is applied to piston 881 through port 874 connected to pipe 20, piston 881 swings counter-clockwise until it engages stop face 872 on tooth 871. At this time the inner sleeve valve is in that angular position which makes port 889 at level "B," Fig. 5C, to be in line with the ports 861 and 811 (see Fig. 5C, level "B") which connects pipe 621 to the pressure chamber 824. Since pipe 621 is connected to cylinder 601 (Fig. 6), the spool valve 618 becomes closed and the pressure chamber 824 becomes disconnected from the source of positive pressure because pipe 20 now is shut off from pipe 21 connected to the mains. At the same time when the push button valve becomes closed, chamber 824 becomes connected at this time to the drain pipe 29 (see Fig. 6) through the drain port 616 which now becomes connected to cylinder 602 and port 617, the latter being connected to pipe 20. When positive pressure in pipe 20 is replaced with the negative pressure, swing piston 881 is returned at once to the position illustrated in Fig. 10 by a spring 893. Examination of Fig. 10 discloses that while swing piston 881 traveled in the clockwise direction, piston 867 traveled in the counter-clockwise direction from stop face 836 to stop face 837. The two pistons meet each other in the manner illustrated in Fig. 10. The reversal of the positive and negative pressures in the pipes 869 and 870 to produce such travel of piston 867 will be described later.

Reverting again to the compression-torsion spring 893, it elastically interconnects the inner sleeve valve 876 with the outer sleeve valve 846 through cup 850, and is used for returning piston 881 to the position indicated in Fig. 10. The inner swing piston 881, therefore, swings counter-clockwise and clockwise in its cylinder 883 which is defined by the bottom disk-shaped portion of valve 846, outer surface of boss 879 and the external surface of the lower wall of drain chamber 825. The upper portion of the inner sleeve valve 876 is provided with a tube 884 which provides a duct 885 connecting the pressure chamber 824 with a stationary pipe coupling 886 connected to pipe 20. The latter is connected to the push button valve 19 which, when open, furnishes hot water under pressure to the pressure chamber 824. The stationary coupling 886 is fastened to the outer cylinder block 800, and it forms a leak-proof rotatable joint with tube 884, an O ring 887 being used for making a leak-proof joint. The compression-torsion spring 893 is fastened at both ends and therefore when valve 876 is turned counter-clockwise by the inner swing piston 881, it unwinds spring 893. This mode of operation of spring 893 makes it possible to maintain a continuous pressure between the bottom of boss 879 and the bottom plate of the outer sleeve valve 846, thus preventing any leakage between the bottom of the two cylinders 846 and 876. Unwinding of spring 893, because of its lengthening in this process also keeps a leak-proof connection between swing piston 881 and its cylinder walls. The inner valve 876, and, more specifically, its chambers 824 and 825, are provided with two pressure ports, 888 and 889, and three drain ports 890, 891 and 892 which connect the positive and negative pressure lines to the respective chambers 824 and 825 in the course of the operating cycle of the extractor. These lines are indicated in Figs. 5A through 5D and will be described later.

*Operation of the distributor valve.*—It is best to outline the operation of the distributor valve alone, without any special reference to the extracting mechanism illustrated in Figs. 5A and 5B, to avoid confusing the reader. Suffice it to say that insofar as the extracting mechanism is concerned, it has two extracting cells and while one cell is used for producing the coffee beverage, the other cell is being prepared for taking the place of the first cell as mentioned before. Since coffee grounds are used, rather than an "instant" coffee essence, the cycles for the cells #1 and #2, although quite straightforward from a purely functional point of view require, nevertheless, proper timing an sequential operation of a number of parts in the extracting mechanism, and the distributor valve acts as an automatic master control board, so to speak, for the entire operation of the extracting machine. Since a fluid-operated mechanism is illustrated here, as being the most reliable, simple and less expensive than an electric one, it follows that positive and negative pressures must be introduced at proper time and place, and for proper length of time, within the extracting mechanism. This is the function performed by the distributor valve. The valve 876 must do so for two different positions of the cells #1 and #2, and this is accomplished by letting the valve 876 operate within the outer sleeve valve 846 in one position, with its swing piston 867 against the stop face 836. While the outer sleeve valve 846 remains stationary in this first position, the inner sleeve valve 846 can rotate within it counter-clockwise, thereby operating the extractor 5A, 5B with the cell #1 in the extracting position. When extraction in the cell has been accomplished, the position of the outer sleeve valve 846 is changed from that illustrated in Fig. 9 to that of Fig. 10, which is approximately 180° from the first position. The inner sleeve valve 876 is also rotated along with the outer sleeve valve 846 approximately 180° without, however, altering the mutual porting between the inner and outer sleeve valves. Only the mutual relations of the porting between the outer sleeve valve 846 and the valve body 800 are altered, and thereby the distributor valve is made ready to actuate the extractor 5A and 5B with the cell #2 in the extracting position. It follows that the ports within the distributor valve, in the main, determine and control the functional cycle of the extracting mechanism. This is indeed the case and it is necessary to introduce the additional valve, the outer sleeve valve 846, only for one purpose, and that is to close off all the ports of the first cycle and open all the ports of the second cycle, the cycle being a complete cycle followed by the extractor until it comes to rest. This will become more apparent from the discussion of the entire operating cycle of the coffee maker later.

The actual operation of the distributor valve is as follows: It is assumed that the valve was left in the position illustrated in Fig. 9, which is one of the two possible rest positions of the valve, the other rest position being illustrated in Fig. 10. High pressure reaches chamber 824 immediately after valve 19 opens; it also at once reaches port 874 through port 849 and undercut 875, which produces counter-clockwise rotation of piston 881, port 878 being connected to the drain pipe 843, or negative pressure thus creating a differential pressure on piston 881 and removing any fluid which may have leaked into cylinder 883 during the rest period. Piston 881, therefore, is free to rotate substantially 360° until the leading face of the piston touches stop face 872. At this instant high pressure is introduced over pipe 869 while pipe 870 is connected to the negative pressure with the result that the outer piston 867 will revolve counter-clockwise until it reaches the stop face 837, as illustrated in Fig. 10. At the same time port 874 is disconnected from the high pressure and connected to the negative pressure with the result that spring 893, which previously was unwound by the counter-clockwise rotation of piston 881, now returns this piston or rotates it in the clockwise direction until it stops at the stop face 873. Accordingly, at this instant the relative positions of the two valves with respect to each other and with respect to block 800 is the one illustrated in Fig. 10, which is the second rest position. This conditions the distributor valve for operation during the next operating cycle of the distributor valve and of the extracting mechanism. The two rest positions of the valves 876 and 846 with respect to block 800 are also illustrated in Figs. 5C and 5D, respectively. Examination of these figures discloses the fact that the sleeve valves 846 and 876 are 180° out of phase, or turned 180° in Fig. 10 from the positions occupied by these elements in Fig. 9 with respect to the outer cylinder block 800. This completes the first operating cycle which ends with piston 867 resting against stop face 837 and piston 881, engaging again stop face 873 in the position approximately 180° out of phase from that illustrated in Fig. 9; this second rest position corresponds to the position illustrated in Fig. 10. It should be noted here that the pistons 867 and 881 are snapped together into the positions illustrated in Fig. 10 by introducing quickly sufficient amount of high pressure fluid through duct 840 and by connecting duct 841 to the negative pressure whereupon spring 893 returns piston 881 to the position illustrated in Fig. 10. From the above description of the first operating cycle of the distributor valve it follows that the useful function is performed in timing the extracting mechanism during the counter-clockwise travel of piston 881 from the positions illustrated in Figs. 9 and 10 to the positions when it is stopped by the stop face 872. The above travel is equal to approximately 360°.

The second operating cycle begins with the sleeve valves being in the position illustrated in Fig. 10. It is to be noted here that the first cycle ends with the push-button valve closed, and therefore the second cycle begins only after the push-button valve 19 is manually actuated in the maner described previously. It is unnecessary to describe the second operating cycle in any detail because it is similar to the first one with the exception that all the elements are returned back to the positions illustrated in Figs. 9 and 5C. As in the previous cycle, useful function is performed when piston 881 is made to travel counter-clockwise from the position illustrated in Fig. 10 until it engages the stop face 872. Quick return of the two valves back to the position illustrated in Fig. 9 merely conditions the valves for the next cycle.

*Extracting mechanism*

(Figs. 5A and 5B)

In the course of the description of Figs. 1, 2 and 3, it is stated that the extracting mechanism has two extracting cells which are shuttled into two positions, extracting and loading, and a brief description of the operating cycle of the extracting mechanism is given. The cross-sectional view of this mechanism is illustrated in Figs. 5A and 5B which, when matched along the matching line 501 discloses this mechanism as a single, complete element.

Referring to Figs. 5A and 5B as a single figure, the extracting mechanism comprises a frame 500 which has a center line 501, the frame, as well as the remaining components of the extractor mechanism, being symmetrical with respect to this line and having identical parts on both sides of axis 501. The main parts of the mechanism are stationary duct and cylinder blocks 502 and 503 with pistons 504, 505, 506 and 507 slidably mounted within the blocks; inner pistons 508 and 509 slidably mounted within the hollow pistons 507 and 506, a central hot water duct composed of two fixed end ducts 510 and 511 mounted within the blocks 502 and 503, respectively, and two central ducts 512 and 513 which are in sliding engagement with the respective end ducts 510 and 511. The outer ends of the central ducts are permanently fixed to the inner pistons 508 and 509 and slide either to the left or right extreme positions with the inner pistons when the pistons are actuated. The inner ends of the inner ducts form a valve by engaging each other or by abutting against each other, the right duct 512 terminating in a V-shaped groove 514, while duct 513 terminates in a V-shaped circular edge 515 fitting into the groove, the angle subtended by the V of the edge being smaller than the angle subtended by the V of the groove. For an enlarged view of the above valve and the central portion of the cells reference is made to Fig. 12 where the described structure is illustrated more in detail. Both V's have finite radius, the edge radius being the smaller of the two. The inner ends of the ducts 512 and 513 are undercut in the vicinity of the "edge" valve, the term which will be used here for the valve formed by groove 514 and circular edge 515. Therefore, there is a clearance 516 between the two duct ends and the inner sleeve 517 supporting the two extraction cells 518 and 519 constituting an integral part of sleeve 517. The cells are also provided with an outer sleeve having three portions, a right sleeve 520, a left sleeve 521 and a central sleeve 522, all of these sleeve parts constituting thin cylindrical elements separated from each other by the spool-shaped cells 518 and 519. The entire cell assembly 530 is held together and constitutes a single integrated slidable element because of the presence of the spool necks 527 which surround ducts 512 and 513. These necks have a plurality of radial orifices 523, 524 and slanting orifices 525 and 526 which are illustrated on an enlarged scale in Fig. 12. Referring again to Figs. 5A and 5B, the central ducts 512 and 513 are also provided with a plurality of slit-shaped openings such as 527 and 528 uniformly distributed around the peripheries of the respective ducts, the ducts being undercut in those portions of the ducts.

Referring once more to the structure of the cell member 530, it is composed of the two axially spaced cells 518 and 519, the hollow central duct 517 and the three sleeves 520, 521 and 522; the cell member 530 forms a sliding fit with reciprocating valves 532 and 533; the outer cylindrical surfaces of the right and left sleeves 520 and 521 form a sliding engagement with the corresponding cylindrical surfaces 534 and 535 of the reciprocating cylindrical valves 532 and 533. The central portion of the cell member 530 also forms a sliding fit with a stationary screen member 529. The sliding cylindrical valves 532 and 533 are surrounded on their outer sides with rotatable valves 536 and 537.

As will be explained more fully in the course of the description of the functioning of the extracting mechanism, which is to follow, the sliding valves 532, 533 and the rotating valves 536 and 537 are used for loading the cells with coffee grounds 33 which are contained in the hopper 12, and for closing and opening the desired portions of the cells when they are connected to hot water supplied through ducts 510, 511, 512 and 513, and slots 528 and 527. Frame 500 is provided with a dome-shaped member 538 provided with two semi-circular cavities 539 and 540, the outer cavity 539 being provided for insulating the coffee grounds from the main body of the extracting mechanism which is maintained substantially at the temperature of hot water continuously circulating through the central duct of the extracting mechanism. Dome 538, additionally, is provided with an insulating lining for preventing excessive continuous heating of the coffee grounds 33. Cell 519 is illustrated in Figs. 5A and 5B in that position which corresponds to the coffee-extraction position. Therefore, provisions must be made for draining the obtained extract, which is accomplished by providing a screen portion 541 in the screen element 529 and the semi-toroidal draining duct 540 in frame 500 which surrounds screen 541 and terminates in a duct 542 connected either to container 18, Fig. 1, or to spout 23, Fig. 2.

The structure of the cylindrical valves 532 and 533 and of screen member 529 is illustrated more fully in Figs. 13 and 14, while the rotatable valves are illustrated on an enlarged scale in Figs. 15 and 16 and will be described now in connection with the above four figures.

Referring to Figs. 13 and 14, they illustrate in perspective view a portion of frame 500, valve 532 and screen member 529. Valve 532 is provided with a piston 543 having an O ring 544 for making a leak-proof joint with the cylindrical surface 545 of frame 500 in which the valve slides in the direction of the longitudinal axis of the mechanism passing through the center of ducts 510 and 511. A spring 546 normally holds valve 532 in open position with the outer face of piston 543 engaging a stop-face 547 of a rotatable ring member 548 which forms a threaded engagement 550 with frame 500.

Digressing for a moment from the description of Figs. 13 and 14, and reverting to Fig. 5B, as will appear from the description to follow, the ring member 548 can be placed into any desired longitudinal position with respect to the longitudinal axis of the extractor by means of a thumb screw 551. This in turn determines the opening of valve 532 with respect to hopper 12, thus adjusting the amount of coffee grounds reaching the extracting cells; this in turn controls the "strength" of the extract obtained during the extracting process. An identical adjustable ring member 552 is provided on the left side of the extractor. The two ring members are interconnected through a shaft 553, pinions 554, 555 and gears 556 and 557, all of which are actuated by means of the thumb screw provided with a pinion 558.

Reverting again to Figs. 13 and 14, the sliding valve 532 forms a sliding engagement with frame 500 through O rings 560 and 544, and it also engages the ring member 548 which is provided with two O rings 561 and 562. The relative positions of valve 532 and filter element 529, illustrated in Fig. 13, corresponds to the open position, and that illustrated in Fig. 14 corresponds to the closed position of valve 532. Two extensions 564 and 565 are provided which form a sliding fit with two corresponding cutouts 566 and 567 in filter member 529. The extensions 564 and 565 are sufficiently long to engage screen member 529 irrespective of the position of the valve, as illustrated in Figs. 13 and 14. When valve 532 is in closed position, a sharp edge 568 engages flat surface 569, thus disconnecting cell 518 from hopper 12. A similar type of engagement takes place simultaneously between sharp edge 570 and flat surface 571, which closes cell 518 at the bottom. Sharp edges 568 and 570 are used for obtaining good seals in spite of the fact that valve 532 closes after cell 518 is filled with fresh coffee grounds and if it were not for the sharp edges there would be a tendency to "pack" or squeeze the coffee grounds between the flat surfaces. As will be explained more in detail later, valve 532 is forced to travel to the left, into its closed position, against the pressure exerted on piston 543 by spring 546, by introducing water under pressure into cylinder 545 through a duct 572, Fig. 5B, which introduces water between piston 542 and stop-face 547 on the adjustable ring member 548 thus pressing on that face of piston 542 which faces stop-face 547. The valve is returned to its open position when duct 572 is connected to the negative pressure, the water from the cylinder is drained, and spring 546 then opens the valve. This valve closes twice through the entire cycle of the extractor, namely before and after cell 518 is loaded with fresh coffee grounds. This will be explained more fully in connection with Fig. 17. After cell 518 is transferred to the left into extracting position (into the position occupied by cell 519 in Fig. 5A) valve 532 opens and remains open for the rest of the cycle, including the step when cell 518 returns back to the right position filled with used coffee grounds and is ready for flushing. At this time the fresh coffee grounds are protected from water, used for cleaning cell 518 and flushing out used coffee grounds into drain 573, by the rotatable valve 536, which is described below. Before proceeding with the description of the rotatable valves 536 and 537, it should be mentioned that the structure and function of the sliding valve 533 is identical to that of valve 532, and, therefore, it needs no additional description.

Referring now to Figs. 5B and Figs. 15 and 16 in particular where the rotatable valve 536 is illustrated in perspective view on an enlarged scale in two possible operating positions, it comprises a hollow cylindrical sleeve 574 having two openings 575 and 576 whose centers are at 90° with respect to each other, and a foraminated portion 577 whose center is 180° from the center of opening 575. The right portion of sleeve 574 is provided with a swing piston 578 which fits into a swing cylinder 579 within frame 500. The swing piston 578 oscillates between two stop faces 580 and 581 of cylinder 579, these faces and the frame being provided with ducts 582 and 583, positive fluid pressure being periodically applied to duct 582, while duct 583 is connected to the negative pressure, or drain. A compressed helical spring 584 is inserted between the back face of piston 578 and a stop-face 584, which is beyond face 581, thus making it possible to make spring 584 longer than the angular distance between the faces 578 and 581. The latter is desirable to make spring 584 exert a more uniform back pressure on piston 578 when it travels from stop 580 to stop 581. The inner surface of sleeve 574 makes a sliding fit over the central screen member 529 and it is also aligned with respect to frame 500 by means of piston 578 and its O ring 571 and O ring 559 in frame 500. Rotatable valve 536 is actuated when positive pressure is applied to piston 578 through a duct 585 connected to duct 582, both of these ducts being connected to the distributor valve 16, Figs. 1 and 2, and Figs. 5C, 5D, 8, 9 and 10. In the position illustrated in Fig. 15 valve 536 is oriented for receiving fresh supply of coffee grounds by cell 518; this same position of valve 536 is also illustrated in Fig. 5B, with the exception that sliding valve 520 is illustrated as being closed since cell 518 in Fig. 5B has been filled with fresh coffee grounds and is ready to be moved to the central extracting position. However, when the sliding valve 520 is open, coffee grounds 33 from hopper 12 are fed by gravity into cell 518 since opening 575 is directly under the hopper. To facilitate, expedite and to make packing of cell 518 with the fresh coffee grounds, the bottom portion of valve 536 is provided with the perforated foraminated area 577 which is now connected to the negative pressure through duct 573 with the result that suction is applied to the coffee grounds in addition to the gravity feed, the two forces combining to obtain fast and uniform charging of cell 518 with the coffee grounds. When valve 536 is in the position illustrated in Fig. 16, cell 518 is disconnected from hopper 12, since the top portion of the valve is closed, and the cell is connected to duct 573 and hot water from the central ducts 512 and 513, duct 512 now being moved to the left so that slits 528 in duct 512 are now directly under the opening 576. Therefore, hot water and the negative pressure in duct 573 combine to flush out the spent coffee grounds out of cell 518 into the drain 573, clean cell 518, and finally dry it, since the slits 528 are then moved into the closed position and hot water is disconnected from cell 518. High temperature of the cell walls and negative pressure combine to produce quick drying of the cell walls.

In concluding the description of the rotatable valve 536 and sliding valve 532 it may be helpful to the understanding of the invention and its functional cycle if one is to regard the rotatable valve as the main valve which determines and controls the steps which take place at any given time, namely, loading with and then unloading cell 518 of coffee grounds, the latter step also including washing and drying of this cell. Since, in order to accomplish these steps, it is necessary to position valve 536 into two different positions, illustrated in Figs. 15 and 16, it becomes necessary to disconnect this valve from hopper 12 and coffee grounds 33 during the transition periods of this valve from one position to the other and to avoid useless waste of coffee grounds in the process. The sliding valve 532 performs this auxiliary function by surrounding its openings at the time the turning valve is turned. It should be also stated that mounting of the sliding valve 532 inside the rotating valve constitutes the better arrangement out of the two possible alternatives, since it produces positive handling of the coffee grounds without trapping them in clearances, and it also enables one to mount the hydraulic motors operating the valves in more advantageous positions within the extractor.

Figures 11A through 11E disclose cross-sectional views of the cells 519 and 518 and of the rotatable valve 536 and sliding valve 532 in various positions. The cross-sections are taken along lines 11—11 and 11A—11A, shown in Figs. 5A and 5B, and, therefore, are taken in the planes perpendicular to the longitudinal axis 531. For simplifying the presentations in these figures, shafts 512 and 513 are not illustrated in these figures. Figure 11A illustrates cell 519 in the central position with the circular valve 515—516 in open position; therefore, hot water enters cell 519 through orifices 523 and 526 and, by agitating the coffee grounds by means of hot water jets emanating from the orifices, extracts the coffee essence from the coffee grounds. The resulting coffee beverage leaves cell 519 through screen 541 and enters duct 540 and leaves the latter through duct 542.

In Fig. 11B cell 518 is illustrated with valve 536 open at the bottom and closed at the top. Valve 532 is open on top and bottom. Therefore, cell 518 is shut off from the fresh coffee grounds 33 and is open to the negative pressure duct 573. In these positions of the two valves, two operating conditions are possible: cell 518 is being rinsed with hot water coming in through the orifices 526 and 523, for flushing out spent coffee grounds, if duct 512 is in the position aligning slits 528 with the cell, permitting hot water from duct 512 to enter the cell; if duct 512 is in the position illustrated in Fig. 5A, no water can enter the cell which is the rest position of cell 519 at the end of the operating cycle. The above position also corresponds to the one at which cell 518, after having been rinsed, is exposed to the drying step with hot water being shut off and with the cell being still connected to duct 573, dries quickly because of reduced pressure and high temperature.

In Fig. 11C the two valves are closed, because it is necessary to prevent the coffee grounds from entering the cell until valve 536 is in the position illustrated in Figs. 11D and 11E. When valve 536 is in the position illustrated in Fig. 11D, it is possible to open valve 532 again because the coffee grounds entering the cell then will be supported by the perforated portion 577 of valve 536 and will not fall through into the drain duct 573. In order to load the cell with the fresh coffee grounds, after the cell has been rinsed and dried, which corresponds to the valve positions illustrated in Fig. 11B, it becomes necessary to close the cell off completely by closing valve 532, in the manner illustrated in Fig. 11C; this makes it possible to open valve 536 on the side facing the coffee grounds while the inner valve is still closed thus preventing the coffee grounds from entering the cell during the time when the outer valve 536 travels 90° from the position illustrated in Fig. 11C to that illustrated in Fig. 11D. Since at this stage (Fig. 11D) valve 536 is closed at the bottom and open at the top, all that remains is to open the inner valve 532, and the coffee grounds will at once fill the cell because of suction produced by the negative pressure in duct 573 as well as gravity pull exerted on the coffee grounds since they are contained in the hopper 12 positioned directly above the cell. This is illustrated in Fig. 11E. It would appear at first glance that the cell is now ready for transfer to the coffee-making position. However, some coffee grounds are present, on the top of the cell, in the space normally occupied by the cylindrical walls of valve 532 in the manner illustrated in Fig. 11E, and these coffee grounds should be displaced into the cell proper and partly into the hopper 12 before the cell can be moved to the central or coffee-making position. This is accomplished by closing valve 532, at which time the valves again assume the positions illustrated in Fig. 11D. After this step the cell is ready for transfer to the central position. An additional explanation for closing valve 532 is as follows. The inner diameter of valve 532 is equal to the inner diameter of the screen member 529 into which the cell and the coffee grounds must slide when cell is transferred from the loading to the extracting position. All coffee grounds within the cell will follow the cell if they are confined to the cylindrical locus whose diameter is equal to the inner diameter of the screen member 529. This will be the case when valve 532 is closed after the cell has been loaded with the coffee grounds since the inner diameter of this valve is equal to the inner diameter of the screen member 529.

From the above description of the functioning of the valves 532 and 536, Fig. 17 may be drawn for one cycle and for two cells using Figs. 11A through 11E as the reference figures for the explanation of this figure. Examination of Fig. 17 indicates at once that during a single cycle the valves 532 and 536 assume seven consecutive positions #1 through #7, position #5 being identical to #3, #6 to #2, and #7 is identical to #1. While the valves 532 and 536 are active loading cell 518 with fresh coffee grounds, the valves 537 and 533 are stationary and remain in the position illustrated at 7A until the next cycle. Cell 519 is moved from the central position to the left position (as viewed in Figs. 5A-5B) simultaneously with the moving of cell 518 into the central position since the two cells represent a single integral element 530 and thus must move as a single unit.

The operation of the valves 535 and 537 is identical to the operation of the valves 532 and 536 but "180° out of phase" with the operation of the valves 535 and 537 if the cycle illustrated in Fig. 17 is considered to constitute only half of the cycle, the complete cycle embracing two push-button operations with the result that the valves 532 and 536 are active during the first half of the cycle and are stationary during the second half. The reverse is true of the valves 535 and 537.

Pistons 504, 505, 506, 507, 508 and 509: Pistons 504 and 505 perform one function; they reverse the position of the distributor valve 16 which is accomplished by connecting either duct 840 or duct 841 (Figs. 9 and 10) to water under pressure while the other duct is connected to the negative pressure. When duct 840 is connected to the negative pressure (drain) and duct 841 to the positive pressure, which is what is illustrated in Figs. 5A-5B and 9, then piston 867 rests against stop-face 836. The other position of the distributor valve is illustrated in Fig. 10 at which time the outer piston 867 rests against stop-face 837. The above is accomplished by placing the pistons 504 and 505 into one of the two possible positions, i. e., both pistons 504 and 505 being in the extreme right positions, as viewed in Figs. 5A-5B, or in the left positions. Since the pistons face each other with their narrow ends, the two pistons are in the two possible opposite positions with respect to each other. The above is described more in detail below.

Both pistons are hollow, reciprocating pistons having sliding cylindrical walls 590 and 591 of one diameter and sliding cylindrical walls 592 and 593 of a larger diameter with recessed necks 594 and 595 and cone-shaped valves 596 and 597. Coil springs 598 and 599 normally hold the pistons in the position occupied by piston 505 at which time the cone-shaped valve 597 engages a corresponding valve seat 701 provided on the frame member 590. The valve seats 700 and 701, besides acting as valves, also act as stop-faces which prevent the pistons from traveling any further due to the pressures exerted on them by the springs 598 and 599. Piston 504 is illustrated in the extreme right position which it assumes when piston 507 travels to its right position. The same is true of piston 505 whose spring 599 becomes compressed and piston 505 shifted to its extreme left position by piston 506. The valve necks 594 and 595 are surrounded by ducts 702, 703, 704 on the right side and ducts 705, 706 and 707 on the left side. Frame 500 is also provided with duct 702 and 705 which connect the central hot water duct 708 to the chambers provided with the poppet valves formed by the valve seats 700 and 701 and the "lift" sliding valves engaging these seats, these lift valves being provided by the enlarged portions 592 and 593 of the pistons and the cone-shaped valves 596 and 597 which either connect or disconnect duct 708 and hot water under pressure from duct 703 or duct 706 and connect these ducts to the negative pressure through the ducts 704 and 707, respectively. The above may be restated by saying that piston 504 is used for connecting duct 703 first to the postive pressure and then to the negative pressure. The same is true of duct 706 and piston 505. Also when duct 703 is connected to the positive pressure, duct 706 is connected to the negative pressure, and vice versa. Ducts 704 and 707 are permanently connected to the negative pressure, or drain, through pipes 710 and 711. Duct 703 is permanently connected through pipe 870 to the inlet-outlet port 840 of the distributor valve, as indicated in Fig. 9. Duct 706 is connected to the inlet-outlet port 841 of the distributor valve through pipe 869.

From the above description of the pistons 504 and 505, it follows that they merely connect first one inlet-outlet port, 840 or 841, to the positive water pressure and then the other. Also, while port 840 is connected to the positive pressure, port 841 is connected to the negative pressure, and vice versa. When this takes place the outer swing piston 867 is either held by means of the postive water pressure in the position illustrated in Fig. 9, or in the position illustrated in Fig. 10. Moreover, reversal of the pressures in the inlet-outlet ports also turns the swing piston in the manner described previously.

Pistons 506 and 507 are mounted in cylinders 714 and 715 respectively. The outer walls of the pistons are recessed in the manner indicated in the figures for transmitting either positive or negative pressures through ducts 730 and 731 to the pistons 508 and 509, respectively, after these pistons recede into the cylinders 728 and 729 formed within the hollow pistons 507 and 506. By providing recesses on the outer walls of the pistons 507 and 506, it is possible to transmit the desired pressures into the inner cylinders 728 and 729 and pistons 508 and 509 irrespective of the angular positions of pistons 507 and 506 with respect to their respective cylinders 714 and 715. Accordingly, it becomes unnecessary to have any guiding or aligning means between the outer pistons 507 and 506 and their cylinders 714 and 715, respectively. Moreover, the recessed structure of the outer piston walls makes it possible to maintain pressure connection between the inner pistons 508, 509 irrespective of the lateral positions of the outer pistons 507 and 506, i. e., when, for example, port 733 is not aligned with a port 735 within the cylinder 715, as illustrated on the left side of the mechanism. The two ports 732 and 734 are aligned on the right side. Both cylinders have recesses 716 and 717 which have drain ports 718 and 719 open to an atmospheric pressure. Therefore, the piston heads adjacent to these ports are always exposed to an atmospheric pressure. The upper right corner of cylinder 714 is connected to a duct 720, the right head of piston 507 being provided with a circular extension 722 with the result that when duct 720 is connected to the pressure chamber 824 of the distributor valve over a pipe 723 and ports 889, 860 and 810 (see Fig. 5C, level "B") water under positive pressure enters the pressure chamber created by a clearance between the right piston head and cylinder 714 and push piston 507 from its extreme right position illustrated in Fig. 5A, to its extreme left position, which is identical to the illustrated position of piston 506 within cylinder 715. Such movement of piston 507 is accompanied by the movement of the hollow central ducts 512 and 513 from the extreme right position, illustrated in Figs. 5A and 5B, to the extreme left position. When this takes place, pistons 506, 509 and 508 also move to the left. Upon release of the double-headed piston 504 by piston 507, spring 598, which was in a compressed state, pushes piston 504 to its extreme left position. This corresponds to the position illustrated for piston 505. At the same time piston 505 is pushed to the left until its left head abuts against the cylinder wall. Simply stated, pistons 504 and 505 "exchange" their respective positions within their respective cylinders. As described previously, such shifting of the positions of the pistons 504 and 505 reverses the pressures in the distributor valve ducts 840 and 841, which rotates the outer swing piston 867. This in turn reverses the action of the distributor valve 16, as described previously in connection with the description of Figs. 8, 9, 10, 5C and 5D, so that the distributor valve again is ready to repeat the timing cycle for the extractor after the cells 518 and 519 have exchanged their respective roles, i. e., cell 519 having been shifted into the loading position, while cell 518 now is shifted to the coffee-making position. To accomplish this shift, the left side of cylinder 715 must be connected now to the negative pressure, which is accomplished through a duct 724, pipe 725 and ports 822, 868 and 892 of the distributor valve. It should be noted here that duct 724 is connected to the positive pressure through pipes 725 and 726, the later pipe being connected to the positive pressure ducts 808, 860 and 889 when these three ducts align themselves with respect to each other so as to transmit positive pressure from pressure chamber 824 to cylinder 715. Similarly, the back end of cylinder 714 becomes connected to the negative pressure through duct 720, pipe 723, a branch pipe 726, and ducts 819, 868 and 892 when these two ducts also align themselves with respect to each other for connecting cylinder 714 to the drain chamber 825. As will be described later, cylinder 714 is connected to the negative pressure when cylinder 715 is connected to the positive pressure, and vice versa, this reversal of pressures in the two cylinders producing a simultaneous travel of the two pistons 507 and 506 and ducts 512 and 513 as a single shuttling unit from right to left and from left to right at the end of each cycle illustrated in Fig. 17.

Pistons 507 and 506 are hollow and form cylinders 728 and 729 which house pistons 508 and 509, respectively. These pistons normally are held within their respective cylinders in the position indicated, on the left side, by piston 509. This is accomplished by means of springs 738 and 739 which are housed within the inner cylinders 728 and 729, respectively. Pistons 508 and 509 are hollow on the sides facing the coffee-making cells 518 and 519, and their inner piston heads are permanently connected to the central sliding ducts 512 and 513, the inner ends of which terminate in the circular valve 514—515. Accordingly, movement of piston 509 to the left, from the position indicated, opens valve 514—515, provided piston 508 remains stationary. If piston 508 moves to the left at the same time, which is the case when piston 507 moves to the left position, then valve 514—515 remain closed, and ducts 512—513 are merely shifted to the left position so as to align them with the new position of the cell member 530 after it is shifted to the left. Shifting of the cell member 530 is accomplished by means of ducts 740, 741, pipes 742—743 and 744—745 (see Fig. 5C). Pipe 742 is connected to the positive pressure ports 809, 859 and 889 which, when they are aligned, introduce positive pressure into duct 740. This shifts the cell member 530 from its right position to its left position. Pipe 743 is connected to port 817, port 864 (port 864 aligns itself with port 817 upon reversal of the distributor valve by actuating swing piston 867) and port 891. Pipe 744 is connected to the negative pressure ports 814, 864, 891 and 890 which drain space 746 between the left side wall of cell 519 and block member 503. Pipe 745 connects the same space 746 to the positive pressure through the ports 807, 859 (when port 859 aligns itself with port 807) and port 889. Thus shifting of the cell member 530 to the two possible positions is accomplished by introducing positive pressure into duct 740 and negative pressure into duct 741 for the from-right-to-left shift, and the pressures are reversed for the opposite shift.

Operation of the extractor

It will be assumed that the initial position of the extractor is the one illustrated in Figs. 5A–5B. When this is the case, then the position of the distributor valve is that illustrated in Figs. 9 and 5C, i. e., piston 867 of the outer sleeve valve 846 is abutting the stop-face 836 of the outer cylinder 800. At this instant pressure chamber 824 of the distributor valve 16 is connected to a pipe 747 through the valve ports 888, 857 and 801, all of which are in line with respect to each other, and are located on the level "A" of the valve. Pipe 747 is connected to a pipe 748. Pipe 749 is connected to a duct 7 which is connected to the ports 735 and 733. This port introduces the pressure to the face of piston 509.

Pressure chamber 824 is closed off on the level "B" at this instant since port 889 does not match any of the other ports on this level at this time. The same is true of chamber 825 on level "D," since port 892 is closed off by the outer sleeve valve 846. On level "C," the negative pressure chamber 825 is connected to pipe 622 through the ports 891, 863 and 813, which connects cylinder 601 to the negative pressure permitting actuation of the push-button valve 19, Figs. 6 and 7. The latter connection, at this time, when the extractor is inactive, merely means that the push button valve cylinder 691 is connected to an atmospheric pressure.

When the push button valve is actuated, positive hydraulic pressure at once is introduced through pipes 21 and 20 to chamber 824, and, through the branch of pipe 20, to port 874. The latter introduces postive pressure on the inner swing piston 881 which begins to revolve the inner swing valve 876.

Introduction of positive pressure into chamber 824 produces two immediate and simultaneous results:

(1a) The inner piston 509, Fig. 5A, is moved to the left position, which also moves the central duct tube 513 to the left position. This, in turn, opens the circular valve 514—515. Opening of this valve connects cell 519 to hot water under pressure and, therefore, extraction of the coffee grounds takes place;

(1b) Simultaneously positive pressure reaches pipe 750 through pipes 748 and 747, and positive pressure is introduced into cylinder 545 through port, or duct, 572. This closes the reciprocating valve 532 against the pressure exerted by spring 546. Valve 532 is illustrated in the closed position in Fig. 5B described above. This closing of valve 532 will make it possible to place the swing valve 536 into that position which will permit loading of cell 518 with fresh coffee grounds from the hopper.

(2) Actuation of the swing piston shifts port 888 on level "A" to the next ports, which are ports 856 and 852. Positive pressure is introduced into pipes 751 and 752, the latter being connected to port 585 and circular cylinder 579. This actuates the swing piston 578 of the swing valve 536, opening valve 536 with respect to the coffee grounds hopper and coffee grounds 33.

Since port 888 no longer matches ports 801 and 857, the inner piston 509 is held in its left position within cylinder 729 by the positive pressure of water trapped in the ducts. Therefore, valve 514—515 is still open, and hot water from the central duct 708 still reaches cell 519 for making coffee extract.

(3) As the inner distributor valve 876 continues to revolve, port 892, level "D," aligns itself with the ports 865 and 818, the latter being connected to pipe 750 and port 572, Fig. 5B. Negative pressure is introduced into piston 545 and, therefore, reciprocating valve 532 opens because of the pressure exerted by spring 546. Since, at this time, the swing valve is already in open position, opening of valve 532 opens cell 518 with respect to the coffee grounds and this cell is filled with the fresh coffee grounds 33 from the hopper. Hot water still reaches cell 519, and, therefore, the process of coffee making still continues.

(4) The next port to be connected is port 890, on "C" level, when it aligns itself with the ports 862 and 812. Port 812 is connected, through a pipe 751, to pipes 752, 753, 754, 755 and 756. Two operations take place at this instant:

(4a) Since only the ports 890, 862 and 812 are in alignment at this instant, negative pressure reaches all of the above pipes, but only pipe 753 is instrumental in introducing a negative pressure into the cylinder of the reciprocating valve 533, and this valve, therefore, is opened for preparing the two valves for that position which will permit eventual flushing of cell 519;

(4b) The circular valve 514—515 is closed, thus stopping the coffee-making process of cell 519. This is accomplished by draining cylinder 728 through the ports 732, 730 and pipes 754, 752 and 751, which permits spring 738 to return the inner piston 508 to its normal position. This, in turn, makes the central duct 512 close the circular valve 514—515.

(5) Closing of the reciprocating valve 532 is the next step. This is accomplished when port 888 on level "A" aligns itself with the ports 858 and 803. The positive pressure chamber 824 then becomes connected to pipes 760, 748 and 750, which again introduces positive pressure into cylinder 545. This closes valve 532, thus shutting off cell 518 from the hopper.

At this time port 890 also aligns itself with the ports 863 and 813, which again connects cylinder 601 of the push-button valve to the negative pressure through pipe 622. Since the push-button valve is held, at this time, in the open position by the positive pressure acting on the head of piston 606, connecting of cylinder 601 to the negative pressure will have no effect on the push-button valve.

(6) The next port to be connected to the extracting mechanism is port 889 on level "B" when it matches ports 859 and 809. This connects the pressure chamber 824 through pipe 742 to port 740. This port conveys the positive pressure to the cylinder within frame 500 which permits the cell assembly 530 to slide over to the left position until it strikes the body member 503. This transfers cell 519, with spent grounds, to the left position where it is washed out and dried, and cell 518, with fresh coffee grounds, is moved to the central position, ready for the next extracting cycle.

Since, at this time, and prior to the actual shifting of the cell member 530 to the left position, the hollow cylinder in frame 500, to the left of cell 519, is filled with water, it becomes necessary to drain off the water to make the above shift possible. This is accomplished by connecting port 741 to the negative pressure through pipe 744, and ports 814, 864 and 890 on level "C." These ports correspond in every respect to the ports 809, 859 and 889 on level "B," i. e., in terms of their angular positions and their circumferential lengths.

It may be recalled that the entire operating cycle of the mechanism is started by shifting the central duct 513 to the left by applying positive pressure to piston 509. At that time duct 513 was shifted to the left, the distance traveled by piston 509 within its cylinder 729 was such as to position slits 527 in line with the left position of cell 519. This being the case, when cell 519 is shifted to the left, the radial openings in this cell will receive at once hot water from the central duct 708 through slits 527. The valves 533 and 537, at this time, are in the position illustrated in Fig. 11B for the corresponding valves 536 and 532, which permits immediate flushing out of the spent grounds.

(7) Almost simultaneous with the above, port 892 on level "D" aligns itself with the ports 867 and 820. The latter is connected through the pipes 751 and 752 to duct 582, Fig. 16. This connects the negative pressure to the swing cylinder which houses pistons 578, thus draining this cylinder. This permits spring 584 to return the piston back to its original position, which is the position illustrated in Fig. 16. This closes the swing valve 536. The positions of the valves 532 and 536 at this time corresponds to that illustrated in Fig. 11C, although cell 518 now is in the central position and, therefore, Fig. 11C corresponds to the above as to the valves, but not as to the cell.

(8) The next step takes place when port 889 on level "B," Fig. 5C, reaches the ports 860 and 810 on level "B." Port 810 transmits positive pressure through pipe 723 and port 720 to the extreme right portion of cylinder 714, into the space between the piston head 722 and the right wall of the cylinder. This pressure moves piston 507 to its extreme left position. Piston 508 follows piston 507, with the result that the central ducts 512 and 513 are shifted to the left through the distance equal to the travel of these two pistons. This shift disconnects cell 519 from the slits 527, which now occupy their extreme left positions, and brings to an end the flushing cycle of cell 519.

When piston 507 travels to the left, it frees piston 504, which now also travels to the left, because of the pressure exerted upon it by spring 598, until its valve 596 engages valve seat 700. This disconnects port 702 from port 703 and connects port 703 to the negative pressure port 704. This reversal of pressure in port 703 is transmitted to pipe 870. Pipe 870 is connected to port 841 (see lower portion of Fig. 9). Therefore, there is a corresponding reversal of pressure in the swing cylinder 835. As will appear presently, there is a reversal of pressure in pipe 869 from the negative pressure to the positive pressure, with the result that the swing piston 867 is snapped quickly in the counterclockwise direction until it occupies the position indicated in Fig. 10. This prepares the distributor valve for its next cycle, except that the cycle described above for the two cells now is reversed, i. e., cell 518 now is ready for extraction, while cell 519 is ready to be loaded with the fresh coffee grounds.

(9) Port 892, level "D," aligns itself with the ports 868 and 822 almost simultaneously with the alignment of port 889 with the ports 860 and 810, which has been described in connection with step 8. Port 822 connects pipe 725 and duct 724 to the negative pressure. This connection drains cylinder 715 and piston 506 is pushed to the extreme left position because of the pressure exerted upon it by spring 739 which previously has been compressed by the movement of piston 509 and ducts 513 and 512. When piston 506 reaches its left position, it pushes piston 505 to the left position which opens valve 597—701 and closes duct 707. This connects duct 706 to duct 705 which connects pipe 869 to the positive pressure. Pipe 869 is connected to duct 840 and, therefore, a positive pressure is applied to piston 867. Since prior release of piston 504 connected pipe 870 to the negative pressure, piston 867 is rotated to its new position illustrated in Fig. 10.

(10) The last step in the cycle takes place when port 889, level "B," reaches ports 861 and 811 and connects pipe 621 to the positive pressure. As described previously, this connects cylinder 601 of the push-button valve 19, Figs. 6 and 7, to the positive pressure, which returns piston 604 from the position illustrated in Fig. 7 to that of Fig. 6, thus closing the push-button valve.

Upon closing of valve 19, pipe 20 becomes connected to the negative, or at least atmospheric pressure, through duct 617, cylinder 602, duct 616 and pipe 29. The pressure in line 20 is released, and spring 893 returns the inner sleeve valve 876 to the position illustrated in Fig. 10, piston 881 now resting against piston 871 in the same manner as before, except for the new position of piston 871.

This transfer of piston 871 to its new position rotates the outer sleeve valve 846 substantially 180° producing the alignment of the ports illustrated in Fig. 5D. Compari- son of Fig. 5D with Fig. 5C discloses that there is an entirely new port alignment in Fig. 5D. For example, on level "A" port 888 now is aligned with the ports 804 and 857, while in Fig. 5C the same port 888 was aligned with ports 801 and 857. Thus the initial connection was transferred from port 801 to port 804, which remained closed in Fig. 5C. Examination of the remaining ports would produce the same results. Such reversal of the connections between the distributor valve and the extracting mechanism reverses the working order of the extractor, i. e., cell 519 during the next cycle will be loaded with the fresh coffee grounds while cell 518 will be used for making extracting beverage. This can be traced very readily in the light of the description given above.

From the description of the extracting mechanism given above, the following general conclusions are applicable: the mechanism is actuated by a push-button which opens the main valve; the valve remains open until the entire cycle is completed, and then automatically returns to the closed position at the end of the cycle. Actuation of the push-button during the cycle will have no effect on the cycle or the valve; it will remain open until the cycle is completed. Therefore, the main valve 19 is tamper-proof.

The entire mechanism is operated by hydraulic means, fluid under pressure in the main tank being used for actuating the distributor valve, which controls and times the entire extracting mechanism. The same distributor valve is used for actuating the extracting mechanism for both extracting cells. One cell is ready for instant use while the other cell remains empty and open during the rest position. Actuation of the push-button valve immediately starts the extracting process, while the other cell is loaded with fresh coffee grounds. Immediately after the extraction process is completed, the loaded cell, with the fresh coffee grounds, is shifted to the extracting position while the cell with the spent grounds is rinsed and dried, thus preparing the mechanism for immediate use in the next extraction cycle. The next cycle begins again with the actuation of the push-button valve.

What is claimed as new is:

1. An automatic extractor comprising a hopper normally containing an extractable material, first and second cells, a source of fluid having positive fluid pressure, first means having a plurality of fluid-operated elements for: filling said first cell with said material from said hopper, connecting said first cell to said source of fluid during the extracting cycle of said first cell and then shutting off said cell from said source upon the completion of the extracting cycle, and for rinsing out said first cell by reconnecting it to said source for a predetermined period of time; second means having a plurality of fluid-operated elements corresponding to the elements of said first means and performing the same functions with respect to the second cell as the functions performed by said first means with respect to said first cell; a distributor valve connected to and actuated by said source of positive fluid pressure, and a plurality of ducts interconnecting said distributor valve and said first and second means, said distributor valve sequencing the operation of said first and second means by sequencing the connections between said ducts and said source.

2. An automatic extractor as defined in claim 1 in which said first and second means comprise a plurality of reciprocating pistons and a corresponding plurality of valves actuated by said pistons.

3. An automatic extractor as defined in claim 1 in which said distributor valve comprises an inner, rotatable sleeve valve having a positive pressure chamber, a negative pressure chamber, and a plurality of ports; an outer cylinder for housing said inner sleeve valve, said outer cylinder having a plurality of ports, and means for rotating said inner sleeve valve with respect to said outer cylinder for connecting sequentially the ports of the inner sleeve valve to the ports of the outer cylinder.

4. A distributor valve comprising an outer hollow cylinder, first and second sleeve valves mounted within said cylinder, said second valve being mounted within said first valve, a plurality of circumferentially positioned ports in each of said cylinder and valves in first, second, third and fourth planes perpendicular to the common longitudinal axis of said cylinder and said valves, a first rotatable piston for rotating said first valve, a second rotatable piston for rotating said second valve, a pressure chamber in said second valve and a drainage chamber in said second valve, all ports lying in said first and second planes being periodically connectable to said pressure chamber, while all ports lying in the third and fourth planes being periodically connectable to the drainage chamber upon the rotation of said valves by said first and second pistons, respectively.

5. An extracting mechanism comprising a frame, a hopper associated with said frame, said hopper normally containing a material having extractable, or soluble, fractions, a central duct within said frame containing a fluid under pressure and elevated temperature, first and second spaced, ring-shaped extracting cells mounted on a common hollow member surrounding said central duct and in sliding engagement with respect to said central duct, first and second spaced openings within said frame having means for conveying said material to the respective cells when said cells are in their respective material-receiving positions, an extracting position for said cells within said frame midway between said material-loading positions, first means for shifting said first cell first to said first, or material-loading position and simultaneously shifting said second cell to said extracting position, second means for shifting said second cell to said second material-loading position while said first cell is shifted to said extracting position, and third means for periodically admitting said fluid into the cells from said central duct only when either one of said cells is shifted to said extracting position.

6. An automatic extractor comprising a closed tank filled with fluid under pressure, a hopper for holding extractable material, an automatic extracting mechanism connected to said hopper and to said tank, said mechanism including a distributor valve connectable to said tank, said distributor valve being operated by said fluid upon it being connected to said tank, first and second extracting cells, a plurality of hydraulically actuated pistons connectable to said tank through said distributor valve, and a corresponding plurality of piston-actuated valves for sequentially filling said cells with said material from said hopper, and then sequentially connecting each cell to said tank for a predetermined period of time for passing the fluid from said tank through each cell, one cell at a time, for obtaining an extract from said material.

7. An automatic extractor as defined in claim 6, which also includes a manually-operated first hydraulic valve connected on one side to said tank and on the other side to said extracting mechanism through said distributor valve, said first valve having first means for maintaining said valve open for a predetermined period of time, and second means for closing said first valve after said predetermined period of time, said first means becoming hydraulically connected to said tank upon the manual operation of said first valve, and said second means becoming hydraulically connected to said tank through the operation of said distributor valve, whereby said valve first connects, and then automatically disconnects, the fluid under pressure, within said tank, to and from said mechanism for hydraulic actuation of said mechanism with the aid of said distributor valve.

8. An automatic extractor as defined in claim 7, in which said first valve also includes a manually actuated plunger for opening said valve, and said first means includes a hydraulically operated piston and a cylinder for holding said valve in an open position; and said second means comprises a second piston, a second cylinder and a spring in said second cylinder for closing said valve when said second cylinder becomes hydraulically connected by said distributor valve to said tank.

9. An automatic extractor as defined in claim 6, in which said extracting mechanism includes a central duct having first and second outer ends, both of said outer ends being permanently connected to said tank, said duct being an open duct with respect to the fluid in said tank, said first end being connected to the upper portion of said tank and said second end being connected to the lower portion of said tank, means for heating the fluid in said tank, said means creating a thermal gradient within said fluid, said thermal gradient producing a constant circulation of said fluid through said duct for maintaining said mechanism substantially at the temperature and pressure of said fluid in said tank.

10. An automatic extractor as defined in claim 9, in which said central duct comprises first and second stationary, open-end tubes, the outer ends of said tubes being connected to said tank and the inner, open-ends of said tubes terminating within said extracting mechanism, third and fourth tubes, said third tube making a sliding, fluid-tight fit with said first tube, and said fourth tube forming a sliding, fluid-tight fit with said second tube, and a valve-forming joint between said third and fourth tubes.

11. An automatic extractor as defined in claim 10, in which said extracting cells comprise a first, inner, hollow cylinder surrounding said central duct, said first cylinder forming a fluid-tight, sliding fit with said central duct, and a second, outer, hollow cylinder spaced from said first cylinder, said extracting cells, being mounted between and interconnecting said first and second cylinders.

12. An automatic extractor as defined in claim 11, in which said fluid-operated distributor valve is interposed between said manually operated hydraulic valve and said extracting mechanism for fluid-operating said extracting mechanism, said valve comprising an outer cylinder having a plurality of ports, an inner sleeve valve within said cylinder, said sleeve valve having a plurality of ports, a rotatable piston constituting an integral part of said sleeve valve, and first and second ports on both sides of said piston for rotating said piston and said sleeve valve in one direction when said first port is connected to a positive pressure and said second port is connected to a negative pressure, and to rotate said piston in the opposite direction when said pressures are reversed, the rotation of said piston producing sequential matching of some of the ports of said inner sleeve valve with some of the ports of the outer cylinder.

13. An automatic extractor comprising a central duct having a longitudinal axis and containing a fluid under pressure, a cell member surrounding said central duct, said cell member having at least first and second cells, a hopper normally containing an extractable material, each of said cells having a first opening at the top portion of said cell for connecting said cell to said hopper for filling said cell with said material, each of said cells also having a plurality of openings surrounding said duct for hydraulically connecting said cell to the fluid within said duct, a first valve for normally closing said first opening, a first fluid-operated means for opening said first valve to connect said first cell to said hopper for gravity-filling said first cell with said material and for subsequently shutting off said first cell from said hopper, and a second fluid-operated valve for hydraulically connecting said second cell to said duct for a predetermined period of time and for admitting the fluid from said duct into said second cell and then shutting off said second cell from said duct.

14. An automatic extractor comprising a fluid-filled tank under pressure, a hopper normally containing an extractable material, an extracting mechanism connected to said tank and to said hopper, said mechanism including a pipe connected to said tank, said pipe including a manually actuated valve for opening said pipe to said fluid and allowing fluid under pressure from said tank to operate said mechanism, a distributor valve connected to said pipe, said distributor valve having a plurality of ports, a plurality of cylinders and hydraulically actuated pistons and piston-actuated valves within said mechanism, said cylinders being respectively connected to said ports, and a cell unit having two pistons, one piston at each end of said unit, and two extracting cells within said unit, said unit including valves, operated by their respective pistons, for filling said cells, one at a time, with said material, and additional valves, also actuated by their respective pistons for connecting the filled cell to said tank for a predetermined period of time for dissolving a soluble fraction from said material, said distributor valve and said pistons and valves moving said cells back and forth for filling each cell with said material, then shifting the filled cell to the position where an additional piston-operated valve admits said fluid to said filled cell for a predetermined period of time for producing said soluble fraction.

15. A fluid-operated distributor valve comprising an outer cylinder having a plurality of ports positioned, respectively, in four transverse planes perpendicular to the longitudinal axis of said outer cylinder and being spaced from each other along said axis, a first swing piston cylinder at one end of said outer cylinder, an outer sleeve valve within said outer cylinder, said outer sleeve valve having an inner, second swing piston cylinder at one end of said outer sleeve valve and a plurality of ports positioned, respectively, in said four planes, a first rotatable swing piston constituting an integral part of said outer sleeve valve, said first swing piston being rotatably mounted in said first swing piston cylinder, and first and second ports in said first swing piston cylinder, said first and second ports, respectively, facing the opposite sides of said first swing piston, first means for rotating said first swing piston and said sleeve valve in one direction by connecting said first port to a positive pressure and said second port to a negative pressure, second means for rotating said first swing piston in the opposite direction by reversing said pressures, the rotation of said first swing piston producing sequential matching of some of the ports of said outer sleeve valve with some of the ports of the outer cylinder, an inner sleeve valve having a second swing piston rotatably mounted in said second swing piston cylinder and a plurality of circumferentially positioned ports lying, respectively, in said four planes, means intermittently introducing said fluid into said second swing piston cylinder for rotating said inner sleeve valve only in one direction, and spring means for rotating said inner sleeve valve in the opposite direction.

16. A distributor valve as defined in claim 15 in which said inner sleeve valve has a pluraltiy of pressure chambers separated from each other, and a corresponding plurality of ducts leading to said pressure chambers, respectively, for conveying any desired fluid pressure to the respective chambers.

17. A distributor valve as defined in claim 16 in which said sleeve valve ports and said outer cylinder ports constitute a plurality of sets of ports, at least one set of ports for each chamber, whereby the sleeve valve ports convey the pressure within the respective chambers to the respective set of the cylinder ports.

18. A distributor valve comprising an outer cylinder block having a plurality of pressure ports and drainage ports distributed around the periphery of said block, said block having a hollow cylindrical portion and a semi-circular swing piston cylinder at one end of said block, said semi-circular cylinder having first and second stop faces at two respective ends of said cylinder, first port adjacent to said first face and having an opening into said swing piston cylinder, a second port adjacent to said second face and having an opening into said swing piston cylinder, an outer sleeve valve having a hollow cylindrical portion with a plurality of pressure ports and drainage ports distributed around the periphery of the cylindrical portion of said outer sleeve valve, one end of said outer sleeve valve having an outer swing piston forming a sliding fit with said semi-circular swing piston cylinder, said outer sleeve valve also having a circular swing piston cylinder at one end of said outer sleeve valve; an inner sleeve valve rotatively mounted within the outer sleeve valve; said inner sleeve valve comprising a hollow cylindrical body having a pressure chamber and a drainage chamber, a partition separating said chambers from each other, a plurality of pressure ports opening into the pressure chamber and a plurality of drainage ports opening into the drainage chamber, and an inner swing piston at one end of said inner sleeve valve for rotating said inner sleeve valve within said outer sleeve valve, said inner swing piston rotatively fitting into said circular swing piston cylinder, said outer and inner swing pistons, when rotated, determining the sequential connection of the pressure ports of the outer cylinder, outer sleeve valve and inner sleeve valve with respect to each other, and the sequential connection of the drainage ports of the outer cylinder, outer sleeve valve and inner sleeve valve with respect to each other.

19. A distributor valve comprising an outer cylinder block having a first cylinder portion provided with a plurality of pressure ports and drainage ports distributed around the circumference of said cylinder portion of said block along a plurality of transverse planes perpendicular to the axis of said cylinder portion, a second cylinder portion at one end of said block, said second cylinder portion constituting a first swing piston cylinder of said valve, said first swing piston cylinder having first and second ports for alternately introducing a working fluid under pressure into said swing piston cylinder through one of said ports while connecting said first cylinder to an atmospheric pressure through the other port, an outer sleeve valve having an outer sleeve valve swing piston, or the first swing piston, slidably fitting into said first swing piston cylinder, said outer sleeve valve also having a plurality of pressure and drainage ports located, respectively, in the same transverse planes as the ports of the first cylinder portion of said outer block, said outer sleeve valve also having a second swing piston cylinder at one end of said outer sleeve valve, and a working fluid port rotatable with said second swing piston cylinder; an inner sleeve valve slidably fitting into said outer sleeve valve, said inner sleeve valve having a pressure chamber, a drainage chamber and pressure and drainage ports located, respectively, in the same transverse planes as the ports of the outer block and the ports of the outer sleeve valve and an inner sleeve valve swing piston or the second swing piston, slidably fitting into the second swing piston cylinder, the rotation of the first and second pistons sequentially connecting the respective ports with respect to each other.

20. A distributor valve as defined in claim 19 in which said inner sleeve valve also includes a cylindrical member having a longitudinal axis coinciding with the common longitudinal axis of the first swing piston cylinder and the outer and inner sleeve valves; a stop member constituting an integral part of said second swing piston cylinder, said cylindrical member forming a sliding, fluid-tight joint with said stop member, and a central duct within said cylindrical member, said central duct being connected to said drainage chamber and to said second swing piston cylinder.

21. A distributor valve as defined in claim 20 in which said outer cylinder block also includes a first stationary duct, a second duct constituting an integral part of said inner sleeve valve, said second duct being fixedly connected to said pressure chamber and rotatively connected to said stationary first duct, and a spring member interconnecting said outer and inner sleeves valves, said spring member being adapted to be wound when said inner sleeve valve is rotated by said inner sleeve valve swing piston.

22. A distributor valve as defined in claim 21 which also includes first means for introducing said working fluid under pressure for a predetermined period of time into said pressure chamber and sequentially into some of said pressure ports upon the rotation of said inner sleeve valve; said first means also introducing simultaneously said working fluid under pressure into said second swing piston cylinder for rotating said inner sleeve valve swing piston and inner sleeve valve with respect to said outer sleeve valve and for winding said spring, said inner sleeve valve swing piston completing its forward stroke due to the pressure of said fluid on said inner sleeve valve swing piston.

23. A distributor valve as defined in claim 22 in which said first means also includes additional means for connecting said pressure chamber and said second swing piston cylinder to a negative pressure upon completion of said forward stroke by said inner sleeve valve swing piston in said second swing cylinder for permitting said spring to produce the return stroke of said inner sleeve valve and of its swing piston.

24. A distributor valve as defined in claim 23 which also includes second means for introducing said fluid under pressure into one end of said first swing piston cylinder upon completion of the forward stroke by said inner sleeve valve swing piston and simultaneously introducing a negative pressure at the other end of said first swing piston cylinder for making said outer sleeve valve and its piston complete its forward stroke while said inner sleeve valve is completing its return stroke under the action of said spring.

25. A distributor valve operated by a fluid under pressure, said valve comprising an outer cylinder block having a first hollow cylinder, said first cylinder having a plurality of ports distributed around the periphery of said first cylinder and lying in a plurality of transverse planes perpendicular to the longitudinal axis of said block, a second hollow swing piston cylinder having first and second stop faces and first and second ports in said outer cylinder block adjacent to the respective stop faces and opening into said second swing piston cylinder; an outer sleeve valve having a third hollow cylinder with a plurality of ports distributed around the periphery of said third cylinder and lying in said plurality of transverse planes, a fourth hollow swing piston cylinder and a first swing piston located at one end of said outer sleeve valve, said first swing piston fitting into said second swing piston cylinder; an inner sleeve valve having a fifth hollow cylinder with first and second centrally located chambers for said fluid, a plurality of ports in said fifth cylinder lying in said plurality of transverse planes, said last ports connecting said first and second chambers, respectively, to the respective ports in said block and said outer sleeve valve, and a second swing piston located at one end of said inner sleeve valve and fitting into said fourth swing piston cylinder.

26. The fluid-operated distributor as defined in claim 25 which includes first means for producing a forward stroke of said second swing piston by rotating said second swing piston in one direction through the entire length of said fourth swing piston cylinder by introducing said fluid into said fourth swing piston cylinder, second means for producing a return stroke of said second swing piston by rotating said second swing piston in the opposite direction through the entire length of said fourth swing piston cylinder, and third means for rotating said first swing piston through the forward stroke when said second piston is being rotated through the return stroke.

27. The fluid-operated distributor as defined in claim 26 which also includes fourth means for rotating said second piston through the forward stroke after the rotation of the first piston through the forward stroke, said first through fourth means thereafter rotating said first and second pistons simultaneously through the return strokes for restoring them to their original position.

28. The fluid distributor as defined in claim 27 which also includes a manually operated push-button and a push-button valve, said push-button valve having means for admitting said fluid under pressure into the first chamber and a negative pressure into the second chamber upon being pushed into the open position by said push-button, said push-button valve having a locking piston-cylinder combination for holding said push-button valve in an open position independent of the position of said push-button, and a return piston-cylinder combination for returning said push-button valve into a closed position.

29. The fluid distributor as defined in claim 28 which also includes a corresponding plurality of ducts connected to the corresponding ports in said block and an extracting mechanism having a plurality of cylinder and piston combinations connected to the respective ducts, some of said ducts being connected to said first chamber and some of said ducts being connected to said second chamber, said distributor valve introducing said fluid under positive and negative pressures irrespectively into said mechanism and into said cylinders for operating said mechanism.

30. An automatic extractor comprising a source of fluid under pressure, an extract-producing material in a hopper, an extractor mechanism having a central duct directly and continuously connected to said source, a push-button valve and a distributor valve serially connected to said source, said distributor valve having a plurality of ports and a sleeve valve, said sleeve valve having a swing piston operated by said fluid for sequentially connecting, or opening, said ports to said fluid, a cell unit having first and second cells, said unit being mounted in sliding engagement with respect to said central duct and in a gravity-feeding relationship with respect to said hopper, said cell unit having a hollow piston at each end of said unit, said distributor valve and said sleeve valve admitting said fluid under pressure first to one piston and then to another piston of said cell unit for positioning said first cell into the first position for receiving said material and simultaneously positioning said second cell into the second position corresponding to the extract-producing position, first fluid-operated piston-and-valve means for opening said cell and allowing said material to fill said first cell and then closing said cell off from said hopper, second fluid-operated piston-and-valve means admitting fluid from said central duct into said second cell while said first cell is being filled with said material, and a plurality of fluid-carrying connections between said distributor valve and all the pistons of said means for sequentially operating said mechanism and said means.

31. The automatic extractor as defined in claim 30 in which said distributor valve includes a first, or pressure, chamber connected to said source of fluid under pressure, said chamber acting as a source of pressure $P_1$, a second, or drainage, chamber having at most an atmospheric pressure $P_2$, and a plurality of connections between said mechanism and said first and second chambers through respective ports in said distributor valve and said sleeve valve, the rotation of said sleeve valve by said swing piston exposing one portion of said piston-and-valve means first to said pressure $P_1$ and the complimentary portion of said means to said pressure $P_2$ for periodically actuating said means in a predetermined sequence for automatically obtaining a fluid extract, or solution, from said material with the aid of said first and second cells.

32. An automatic apparatus for making a hydraulic solution from a material containing water-soluble fractions, said apparatus including a source of hot water under pressure, a frame, a hopper normally containing said material, a first central hollow duct within said frame, a second duct means connecting said first duct to said source of hot water, a sleeve valve slidably mounted over said first duct, a cell member having at least one cell for alternately receiving said material from said hopper and then hot water from said central duct through said sleeve valve, said cell member including a central tubular member slidably mounted over said sleeve valve, a negativepressure-and-drain duct within said frame connected to a source of negative pressure, first hydraulically actuated means for opening and closing said sleeve valve and for hydraulically connecting said cell to said central duct for a predetermined period of time, second hydraulically actuated means for connecting and disconnecting said cell to and from said hopper and simultaneously and synchronously connecting and disconnecting said cell to and from said source of negative pressure for filling said cell with said material from said hopper with the aid of said negative pressure, said second means also including means for connecting said cell solely to said source of negative pressure, a solution-receiving duct within said frame, and third hydraulically actuated means for shuttling said cell member between said negative-pressure-and-drain duct and said solution-receiving duct.

33. The automatic apparatus as defined in claim 32 which also includes a hydraulically actuated distributor valve having a positive pressure chamber and a negative pressure chamber, a push-button valve, said distributor valve and push button valve being connected in series between said source of hot water and said negative pressure-and-drain duct, and a plurality of positive pressure ducts and negative pressure ducts interconnecting said distributor valve and the chambers in said distributor valve with said first, second and third hydraulically actuated means, said distributor valve automatically controlling the operating cycle of said apparatus.

34. The automatic apparatus as defined in claim 33 in which said distributor valve has means for actuating said first, second and third means so as to have said cell simultaneously connected to the negative source of pressure through said negative pressure-and-drain duct while said cell is also connected to said positive source of pressure through said central duct and open sleeve valve for first rinsing said cell with hot water and then drying said cell with the aid of negative pressure.

35. In an automatic apparatus for making a hydraulic solution from a material containing water-soluble fractions, said apparatus including a first central hollow duct connected to a source of hot water under positive pressure, a sleeve valve slidably mounted over said first duct, and a cell member slidably mounted over said sleeve valve, said cell member including at least one cell having the shape of a ring surrounding said sleeve valve.

36. The automatic apparatus as claimed in claim 35 in which said cell has two side-walls diverging toward the outer periphery of said cell, the inner ends of said sidewalls being joined together by the inner perforated portion of said cell for admitting said hot water into said cell, and the outer ends of said walls being spaced from each other to form the open end of said cell.

37. In an automatic apparatus for making a hydraulic solution from a material containing water-soluble fractions, said material being initially located in a hopper, said apparatus including a cell member having at least one ring-shaped cell, first means connected to said cell for alternately positioning said cell member into two laterally displaced positions, the first position being that for filling said cell with said material from said hopper and also for subsequent washing out of the spent material from said cell and rinsing and drying of said cell, and the second position being that for obtaining said solution by connecting said cell to a source of water under positive pressure, first valve means for simultaneously disconnecting and then connecting the upper side of said cell to said hopper and to said material and the lower side of said cell to a drain duct, said first valve means having a to and from, or reciprocating, movement parallel to the longitudinal axis of said cell member, said first valve means being adjacent to and, in part, surrounding said cell member, and second valve means for alternately connecting and disconnecting said cell either to said hopper or to said drain duct, said second valve means, in part, surrounding said first valve means and having a rotational movement with respect to said first valve means, said cell member and the longitudinal axis of said cell member.

References Cited in the file of this patent

UNITED STATES PATENTS

| | | |
|---|---|---|
| 697,881 | Poetz | Apr. 15, 1902 |
| 1,467,778 | Paola | Sept. 11, 1923 |
| 1,551,855 | Svendsgaard | Sept. 1, 1925 |
| 1,584,407 | Thomas | May 11, 1926 |
| 1,621,620 | Bast | Mar. 22, 1927 |
| 1,762,208 | Aborn | June 10, 1930 |
| 1,762,209 | Aborn | June 10, 1930 |
| 1,804,795 | Lee | May 12, 1931 |
| 1,805,159 | Bauer et al. | May 12, 1931 |
| 1,939,280 | Schietzel | Dec. 12, 1933 |
| 2,014,325 | Gulli | Sept. 10, 1935 |
| 2,349,641 | Tucker et al. | May 23, 1944 |
| 2,380,046 | Huguenin | July 10, 1945 |
| 2,511,538 | Muller | June 13, 1950 |
| 2,515,730 | Ornfelt | July 18, 1950 |
| 2,538,215 | Stack | Jan. 16, 1951 |
| 2,564,896 | Gustafsson | Aug. 21, 1951 |
| 2,566,436 | Waite | Sept. 4, 1951 |

FOREIGN PATENTS

| | | |
|---|---|---|
| 391,364 | Germany | 1922 |
| 403,379 | Great Britain | 1933 |